(12) United States Patent
Bouchier et al.

(10) Patent No.: US 11,378,803 B2
(45) Date of Patent: *Jul. 5, 2022

(54) METHODS AND SYSTEMS FOR AUGMENTED REALITY

(71) Applicant: Essilor International, Charenton le Pont (FR)

(72) Inventors: Aude Bouchier, Charenton le Pont (FR); Claudine Biver, Charenton le Pont (FR); Jean-Paul Cano, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 206 days.

This patent is subject to a terminal disclaimer.

(21) Appl. No.: 16/708,970

(22) Filed: Dec. 10, 2019

(65) Prior Publication Data

US 2020/0142199 A1 May 7, 2020

Related U.S. Application Data

(63) Continuation of application No. 15/563,723, filed as application No. PCT/EP2016/057334 on Apr. 4, 2016, now Pat. No. 10,534,174.

(30) Foreign Application Priority Data

Apr. 3, 2015 (EP) .................................... 15305504

(51) Int. Cl.
*G02B 27/01* (2006.01)
*G02B 5/32* (2006.01)
(Continued)

(52) U.S. Cl.
CPC .......... *G02B 27/0172* (2013.01); *G02B 5/32* (2013.01); *G02B 27/0103* (2013.01);
(Continued)

(58) Field of Classification Search
CPC ................. G02B 27/0172; G02B 5/32; G02B 27/0103; G02C 7/024; G02C 7/027; G02C 7/06; G02C 7/086; G02C 7/14
(Continued)

(56) References Cited

U.S. PATENT DOCUMENTS

| 5,864,432 A | 1/1999 | Deter |
| 8,465,153 B1 | 6/2013 | Bruun-Jensen et al. |
| 2010/0171922 A1 | 7/2010 | Sessner et al. |
| 2012/0057122 A1 | 3/2012 | Guillot et al. |

(Continued)

FOREIGN PATENT DOCUMENTS

| EP | 13306208 | * | 9/2013 |
| EP | 13306208.3 | | 9/2013 |
| FR | 2 938 934 A1 | | 5/2010 |

(Continued)

OTHER PUBLICATIONS

International Search Report dated Jul. 7, 2016, in PCT/EP2016/057334, filed Apr. 4, 2016.

*Primary Examiner* — James R Greece
(74) *Attorney, Agent, or Firm* — Oblon, McClelland, Maier & Neustadt, L.L.P.

(57) ABSTRACT

The present invention generally provides systems, methods and ophthalmic lenses for image display of a virtual image, such as the display of a holographic image.
According to the invention, an ophthalmic lens is advantageously configured for optimizing the visualization of said displayed virtual images.

9 Claims, 20 Drawing Sheets

(51) Int. Cl.
*G02C 7/08* (2006.01)
*G02C 7/06* (2006.01)
*G02C 7/14* (2006.01)
*G02C 7/02* (2006.01)
*G03H 1/04* (2006.01)

(52) U.S. Cl.
CPC ............ *G02C 7/024* (2013.01); *G02C 7/027* (2013.01); *G02C 7/06* (2013.01); *G02C 7/086* (2013.01); *G02C 7/14* (2013.01); *G02B 2027/0107* (2013.01); *G02B 2027/0109* (2013.01); *G02B 2027/0174* (2013.01); *G02B 2027/0178* (2013.01); *G02C 2202/20* (2013.01); *G03H 2001/0439* (2013.01); *G03H 2270/21* (2013.01); *G03H 2270/55* (2013.01)

(58) Field of Classification Search
USPC ......................................................... 359/630
See application file for complete search history.

(56) References Cited

U.S. PATENT DOCUMENTS

2013/0050789 A1* 2/2013 Pyun ..................... G03H 1/04
                                                              359/19
2015/0124214 A1   5/2015 Contet et al.
2016/0216515 A1*  7/2016 Bouchier .............. G06T 19/006

FOREIGN PATENT DOCUMENTS

WO   WO 2014/001495 A1   1/2014
WO   WO 2015/032828 A1   3/2015

* cited by examiner

METHODS AND SYSTEMS FOR AUGMENTED REALITY

FIELD OF THE INVENTION

The invention relates to methods and systems for augmented reality.

The invention relates more particularly to the visualisation of virtual images.

BACKGROUND OF THE INVENTION

Head-mounted devices with display features are known in the art. Such devices include so-called 'smart glasses', which allow the wearer thereof to visualize images or text for augmented reality.

In order to improve wearer visual comfort, it is desirable to provide methods and systems wherein images and text are displayed in a customized way that is specifically adapted to the wearer and/or to the worn device.

For ametropic wearers, visual comfort requires that suitable correction is provided not only for 'natural vision' (vision of the environment surrounding the wearer), but also for the visualization of the virtual image or holographic image.

For emmetropic wearers, correction for virtual vision may be required, for example following reduced reserve of accommodation, or for providing specific vision in different gaze directions (for example near-vision versus far-vision).

SUMMARY OF THE INVENTION

The present invention generally provides systems, methods and ophthalmic lenses for image display of a virtual image.

According to the invention, an ophthalmic lens is advantageously configured for correcting the wearer's virtual vision. The vision may be corrected as follows: for an ametropic wearer, both natural vision and virtual vision may be corrected. For an emmetropic wearer, the prescription data are deemed to be null, so that natural vision may not be corrected, while virtual vision may be corrected, for example due to lack of reserve of accommodation. In such case, it is possible to provide a correction for virtual vision as a function of gaze directions and/or as a function of distance of visualization. In broad terms, the invention relies on the implementation of a holographic mirror in an ophthalmic lens. The mirror is a holographic mirror, in that it was recorded using a holography process. But according to the invention, the holographic mirror is for visualization purposes. This mirror is used to reflect a light beam generated form an image source, so as to cause the visualization of the image by the wearer. The holographic mirror is not used to reconstruct a recorded holographic image (as is the case in traditional hologram viewing). Due to the recording, advantageously according to the invention, the mirror is imparted an optical function, that is able, to modify the wavefront of the light beam stemming from the image source, upon reflection onto said mirror. This allows to correct the virtual vision of the wearer, because the lens of the invention (incorporating the mirror), can modify the light beam that generates the image in the eye of the wearer.

The virtual image is thus not necessarily a holographic image. It can be any virtual image, such as a 2D or 3D image. The nature of the image results from the nature of the image source, not from the holographic nature of the holographic mirror. It is possible to use, as an image source, a holographic image source, in which case the virtual image is a holographic image.

Systems of the Invention

The present invention provides an ophthalmic lens supply system. The ophthalmic lens supply system is for providing an ophthalmic lens intended to be fitted onto a frame and worn by a wearer, wherein said ophthalmic lens comprises a holographic mirror and wherein said frame comprises a build-in image source configured for illuminating said holographic mirror so as to cause, upon reflection onto said holographic mirror, the visualization of a virtual image by the wearer, wherein said ophthalmic lens is configured for correcting the wearer's virtual vision, said supply system comprising:

first processing means (PM1) configured for placing an order of an ophthalmic lens, wherein said first processing means (PM1) are located at a lens ordering side (LOS) and comprise:
  inputting means (IM1) configured for the input of wearer prescription data (WPD),
  optionally, inputting means (IM2) configured for the input of frame data (FD), wherein said frame data (FD) comprise at least one image source data;
second processing means (PM2) configured for providing lens data (LD) based upon wearer prescription data (WPD), wherein said second processing means (PM2) are located at a lens determination side (LDS) and comprise outputting means (OM) configured for outputting said lens data (LD), and
first transmission means (TM1) configured for transmitting said wearer prescription data (WPD) and optionally for transmitting said frame data (FD), from said first processing means (PM1) to said second processing means (PM2),
wherein said supply system optionally further comprises
  manufacturing means (MM) configured for manufacturing an ophthalmic lens based upon lens data (LD) and frame data (FD), wherein said manufacturing means are located at a lens manufacturing side (LMS), and
  second transmission means (TM2) configured for transmitting said lens data (LD) from said second processing means (PM2) to said manufacturing means (MM),
wherein said manufacturing means (MM) comprise means configured for recording a holographic mirror.

Methods of the Invention

The present invention provides a method for providing an ophthalmic lens intended to be fitted onto a frame and worn by a wearer, wherein said ophthalmic lens comprises a holographic mirror (HM) and wherein said frame comprises a build-in image source configured for illuminating said holographic mirror so as to cause, upon reflection onto said holographic mirror, the visualization of a virtual image by the wearer, wherein said ophthalmic lens is configured for correcting the wearer's virtual vision, said method comprising the steps of:
(a) providing an ophthalmic lens having a front surface and a rear surface,
  wherein said ophthalmic lens comprises a film (F) of unrecorded holographic medium,
  wherein said ophthalmic lens optionally further comprises an amplitude modulation cell, for example selected from electrochromic cells, polarizing cells and photochromic cells, (b) performing holographic recording of said holographic medium by generating interference between a reference beam (RB) and an illumination beam (IB) so as to provide an ophthalmic lens comprising a holographic mirror (HM), wherein the holographic recording is performed in an optical arrangement that takes into account at least the configuration of the frame, and (c) optionally cutting the lens obtained from step (b).

In some embodiments, the optical recording of step (b) further takes into account:
the distance of visualization (D) of said displayed virtual image by the wearer when wearing the frame and/or
the direction of visualization of said displayed virtual image by the wearer when wearing the frame and/or
the number of areas of the holographic mirror for the visualization of said displayed virtual image by the wearer when wearing the frame.

In some embodiments, the wearer is ametropic, the ophthalmic lens of step (a) is configured for correcting the wearer's ametropia for natural vision and is selected from single-vision lenses, multifocal lenses, for example selected from bifocal lenses, and progressive addition lenses.

In some embodiments, in the ophthalmic lens of step (a):
the unrecorded holographic medium is selected from dichromated gelatins and photopolymers, and
the film (F) of unrecorded holographic medium is provided on the front surface of the ophthalmic lens, on the rear surface of the ophthalmic lens, or between the front surface and the rear surface of the ophthalmic lens.

In some embodiments, the optical arrangement of step (b) is such that the illumination beam (IB) is spatially configured with:
one or more recording lenses (RL, RL1, RL2) selected from unifocal lenses, multifocal lenses such as bifocal lenses, and progressive addition lenses, or a lens matrix (LM), or an active lens with phase modulation and optionally an opaque mask (M).

In some embodiments, the optical arrangement of step (b) is such that:
the reference beam (RB) simulates the beam of the build-in image source to be used for illuminating said holographic mirror so as to cause the display of the virtual image to be visualized by the wearer when wearing the frame, and
the illumination beam (IB) is configured so as to define
the distance of visualization (D) of said displayed virtual image by the wearer when wearing the frame and/or
the direction of visualization of said displayed virtual image by the wearer when wearing the frame and/or
the number of areas of the holographic mirror for the visualization of said displayed virtual image by the wearer when wearing the frame.

In some embodiments, the optical arrangement of step (b) is such that the illumination beam (IB) is configured so as to differentially record a plurality of areas (A1, A2, NV, FV) on the film (F) of unrecorded holographic medium, optionally wherein each area (A1, A2; NV, FV) corresponds to equal or distinct values of distance of visualization (D; D_nv, D_fv) of said displayed virtual image by the wearer and/or corresponds to equal or distinct directions of visualization of said displayed virtual image by the wearer.

In some embodiments, the optical arrangement of step (b) is such that the illumination beam (IB) is configured in accordance with an ergorama, wherein said ergorama defines the distance of visualization (D) and/or direction of visualization of said displayed virtual image by the wearer as a function of the gaze directions when wearing the frame.

In some embodiments, the wearer is ametropic and said method is a method for providing a progressive addition lens (respectively a multifocal lens such as such as a bifocal ophthalmic lens, respectively a single-vision lens), wherein the ophthalmic lens of step (a) is a progressive addition lens (respectively a multifocal lens such as a bifocal ophthalmic lens, respectively a single-vision lens), and wherein the holographic recording of step (b) is performed so that the holographic mirror (HM) comprises at least an area for near vision (NV) and an area for far vision (FV) corresponding to distinct values of distance of visualization (D_nv, D_fv) of displayed virtual image by the wearer.

In some embodiments, the wearer is ametropic and said method is a method for providing a single-vision lens, wherein the ophthalmic lens of step (a) is a semi-finished lens blank, wherein the optical arrangement of step (b) includes the implementation of an auxiliary single-vision lens (AL) whose optical power takes into account the optical power required to correct the wearer's ametropia and the optical power of the semi-finished lens blank, and wherein the auxiliary single-vision lens (AL) is for spatially configuring the reference beam (RB) or the illumination beam (IB).

Lenses of the Invention

The present invention provides an ophthalmic lens configured for correcting at least partially the wearer's vision for the visualization of a displayed virtual image, wherein said ophthalmic lens comprises a holographic mirror (HM) or a film (F) of unrecorded holographic medium, optionally wherein said ophthalmic lens is selected from single-vision lenses, multifocal lenses such as bifocal lenses and progressive addition lenses, and semi-finished lens blanks.

In some embodiments, said ophthalmic lens is intended to be fitted onto a frame and worn by said wearer, wherein said ophthalmic lens comprises a holographic mirror (HM) and wherein said frame comprises a build-in image source configured for illuminating said holographic mirror so as to cause, upon reflection onto said holographic mirror, the visualization of a virtual image by the wearer.

In some embodiments, said holographic mirror (HM) is made from a material (respectively, said holographic medium is) selected from dichromated gelatins and photopolymers, and wherein said holographic mirror (HM) (respectively, said film (F) of unrecorded holographic medium) is provided on the front surface of the ophthalmic lens, on the rear surface of the ophthalmic lens, or between the front surface and the rear surface of the ophthalmic lens.

In some embodiments, the wearer is ametropic and the ophthalmic lens is a progressive addition lens (respectively a multifocal lens such as a bifocal ophthalmic lens, respectively a single-vision lens), and the holographic mirror (HM) comprises at least an area for near vision (NV) and an area for far vision (FV) corresponding to distinct values of distance of visualization (D_nv, D_fv) of displayed virtual image by the wearer, wherein said ophthalmic lens is configured for correcting at least partially the wearer's ametropia for the visualization of said displayed virtual image.

In some embodiments, the holographic mirror (HM) comprises at least an area for near vision (NV) and an area for far vision (FV), and
wherein the holographic mirror (HM) is configured so that it has an addition with a negative value, wherein the addition of the holographic mirror is defined as the difference:

$$P\_NV - P\_FV$$

wherein P_NV is the optical power for near vision and P_FV is the optical power for far vision.

Figures are not necessarily drawn to scale and generally are for illustrating purposes on a schematic basis. Sometimes, elements are not shown so as to simplify representation.

Definitions

The following definitions are provided to describe the present invention.

"Computer-generated images" are known in the art. According to the present invention, computer-generated images comprise any computer-generated images, such as 2D- or 3D-diffraction images, 2D- or 3D-computer-generated holographic images, any amplitude images etc. Computer-generated images may be used as virtual images.

"Holographic images" are known in the art. Such holographic images can be displayed by reading (illuminating) holograms. Computer-generated holograms are also referred to as synthetic or digital holograms. Computer-generated holograms are generally obtained by selecting a 2D or 3D image, and digitally computing a hologram thereof. The holographic image can be displayed by optical reconstruction, namely by illuminating (reading) the hologram with a suitable light beam (reference beam of the hologram). Holographic images can be 2D or 3D.

"Holographic mirror" are known in the art. Such mirrors can be obtained from specific materials such as dichromated gelatins or photopolymers. Photopolymers can be in any physical state (liquid, solid, paste, etc.) and include those solid and those liquid under standard conditions. The mirror function is holographically recorded in the specific material.

Photopolymer formulations contain generally one or more monomers or oligomers presenting at least an ethylenically unsaturated photo polymerizable part and at least a system of photo-initiation of polymerization with at least one component that is sensitive to the illumination wavelength. They can contain a combination of a photo-initiator and a photo-sensitizer that allow the increase of the range of the spectral sensitivity for visible light.

These photopolymer formulations can contain various additives such as, in a not exhaustive list, polymers, solvents, plasticizers, transfer agents, surfactants, anti-oxidizing agents, thermal stabilizers, anti-foaming agents, thickeners, levelling agents, catalysts and so on.

Examples of photopolymers include commercial photopolymers, such as OmniDex (E.I. du Pont de Nemours (EP 0377182 A2)), Bayfol HX (Bayer), Darol (Polygrama) or SM-TR Photopolymer (Polygrama).

Figure 2:
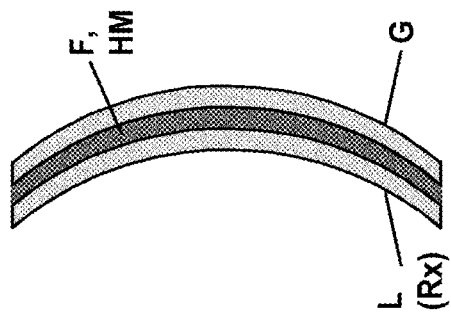
FIG. 2 shows lenses of the invention.
Figure 2:
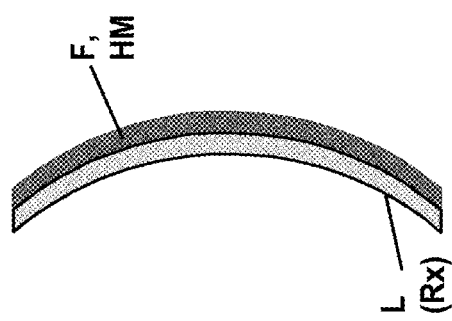

Depending on their composition, in particular on the presence or not of solvents and on their viscosity, different types of processing can be envisaged. The thickness of the photopolymer layer may be from 1 to 100 μm and preferentially from 4 to 50 μm. The formulations containing solvents can be processed in different ways, for example by spin coating, dip coating spray or bar coating of a plane substrate of glass (mineral or organic), or by spin coating, dip coating or spray coating on a curved substrate of glass (mineral or organic) in order to obtain the desired thickness. After coating, a step of evaporation of the solvent(s) is generally necessary to obtain the layer of photopolymer ready to be recorded (FIG. 2(a)).

When the formulations do not contain solvents, they can be used in the same way if their viscosity is not too high. In this case the evaporation step is not necessary. Nevertheless a preferred method consists in the direct encapsulation of the photopolymers between two glass plates (mineral or organic), with a plane or curved shapes (FIG. 2(a)).

Two methods can be used in this case. In the first one, the quantity of liquid required for a thickness from 5 to 50 μm, depending on the photopolymer, is deposited on the glass plate. The liquid contains spacers made of glass or polymer, of diameter from 5 to 50 μm adapted to the final desired thickness. The second glass plate is placed on the liquid drop. It allows the spreading and the confinement of the photopolymer. After exposition and polymerization the photopolymer is solid (or at least gellified) and it attaches the two glass plates together. A peripheral sealing is then performed to protect the edge of the photopolymer from contacts with liquids or atmosphere that may damage it along the time.

In the second method, a cell is assembled with two plates of glass (plane or curved) and sealed all along the periphery except at a hole that allows the filling of the cell with the liquid photopolymer. The filling can be performed by putting the cell under low pressure or vacuum and plunging it in the photopolymer. The hole is then sealed with organic glue, for example a glue that polymerizes under UV or thermal treatment.

Another method comprises:
the deposition of the photopolymer on a flexible substrate, like a polymer film, polyester for example,
the removal of eventual solvents by evaporation or heating,
the transfer of the film coated by the photopolymer onto a substrate (mineral or organic) with plane or curved shape using well-known transfer processes and adapting them to used materials (film and photopolymer) (for example ESSILOR patent applications WO2007144308 A1, WO2010010275 A2). The photopolymer can be, in this case, at the surface of the transferred film or in contact with the substrate.

After deposition of the photopolymer and before its exposure, one needs to let it rest during typically 15 minutes to 2 hours. The stress linked to the process of deposition disappears during this time. After the recording of the holographic mirror, a post-exposition under UV is performed to polymerize the residual monomers.

The photopolymer layers can be coloured with photo-sensitizers that absorb a part of the visible light. These photo-sensitizers are preferentially chosen to lose completely their colour after exposition to the visible light. A post-exposition under UV or white light reduces the residual absorption.

A thermal treatment can be realised depending on the used materials to increase the refractive index modulation of the hologram and its diffraction efficiency.

"Head-mounted display devices" (HMD) are known in the art. Such devices are to be worn on or about the head of a wearer, including helmet-mounted displays, optical head-mounted displays, head-worn displays and the like. They include optical means for displaying an image for visualization by the wearer. The HMD may provide for the superimposed visualization of a computer generated image and of a 'real-life' vision field. The HMD may be monocular (single eye) or binocular (both eyes). The HMD of the invention can take various forms, including eyeglasses, masks such as skiing or diving masks, goggles, etc. The HMD may comprise one or more lenses. Said lenses can be selected from prescription lenses. According to the invention, the HMD comprises a spatial light modulator (SLM). In preferred embodiments, the HMD is a pair of eyeglasses provided with lenses.

"Spatial light modulators" (SLM) are known in the art. Said SLM can be a phase SLM, a phase-only SLM, an amplitude-only SLM, or a phase and amplitude SLM. Where present, the amplitude modulation is preferably independent from the phase modulation, and allows for a reduction in the image speckle, so as to improve image quality in terms of grayscale. A SLM may be:
a reflective SLM (the light beam that causes the display is reflected on the SLM). Examples thereof include SLMs made of LCoS material (Liquid Crystal on Silicon). Possible commercial sources include Holoeye, Boulder Nonlinear Systems, Syndiant, Cambridge technologies; or
a transmissive SLM (the light beam that causes the display is transmitted through the SLM). Examples of possible commercial sources include Boulder Nonlinear Systems and Holoeye "Image sources" IS are known in the art. According to the invention, an image source IS is any light source that can emit a light beam suitable (arranged, configured) for displaying the image for visualization by the wearer. Visualization occurs after the illumination beam stemming from the image source is reflected onto the holographic mirror. Regarding display of holographic images, the light beam comprises the reference beam for the hologram. The image can be displayed from image data (for example computer-generated image data.

According to the invention, the IS may be any image source configured for the display of virtual images (computer-generated images). It may be a screen (for example OLED, LCD, LCOS, etc.), a phase and/or amplitude SLM (Spatial Light Modulator) taken in combination with its light source (for example laser, diode laser, etc.), a projector such as a picoprojector (MEMS or DLP, that may use LEDs, diodes lasers, etc.), or any other source. The IS may also include any other image source (computer-generated image source), and/or control electronics and/or power supply etc.

For monochromatic use, it is preferred that the light beam emitted for image display comprises green light (wavelengths of about 500-560 nm). Green light is advantageous in that a lower energy (for example <1 mW) is required since the human retina is more sensitive to wavelengths in this range. Examples of monochromatic light sources with emission at about 520-550 nm include green OLED displays, class 2 lasers, lasers at 532 nm, laser diodes at 520 nm (for example from Osram or Nichia), LED emitting at around 550 nm, etc. Preferably, the power of the monochromatic source is <10 mW. Other suitable monochromatic light sources include red: 615-645 nm; green: 520-550 nm; blue: 435-465 nm.

"Frame data" refers to a set of one or more data relating to the structure of the frame, and may comprise design parameters such as the relative location of one element of the frame. Examples include data such as pantoscopic angle, curve, shape and dimensions of the frame, etc. Frame data FD may include at least one image source data ISD. This includes the location of the image source, the relative location (distance and/or spatial orientation) of a image source with reference to one or both lenses in the frame, the relative location (distance and or spatial orientation) of a image source with reference to one or both holographic mirrors in the frame. For example, when the image source is imaged trough a lens between the holographic mirror and the image source, the relative location is the virtual distance of the image source. This also includes data pertaining to the features of the image source itself, such as the wavelength/s of emission, the power, the aperture, etc.

"Lens data" (LD) refers to a set of one or more data characterizing an ophthalmic lens. Said data comprise data defining one or more geometrical (surface) characteristics and/or one or more optical characteristics of the lens, such as the optical index of the lens material. Lens data LD may correspond to the back surface of a lens and/or to the front surface of a lens, or their relative positions. Said lens data LD may further include data pertaining to the general geometry of the lens, for example average radius of curvature, convexity data, etc. Said lens data LD may also comprise data on surface coatings of the lens being present on the lens and characteristics thereof; data pertaining to a holographic mirror being present on the lens and characteristics thereof; or data pertaining to any amplitude modulation materials such as electrochromic materials being present in the lens and characteristics thereof.

"Wearer ophthalmic data" or "ophthalmic data" OD are known in the art. Wearer ophthalmic data include wearer prescription data PD, wearer eye sensitivity data SD and wearer ophthalmic biometry data BD, and generally data pertaining to any wearer vision defect, including for example data pertaining to chromatic aberrations, lack of eye lens (aphakia), etc.

"Prescription data" PD are known in the art. Prescription data refers to one or more data obtained for the wearer and indicating for each eye a prescribed far vision mean refractive power $P_{FV}$, and/or a prescribed astigmatism value $CYL_{FV}$ and/or a prescribed astigmatism axis $AXE_{FV}$ and/or a prescribed addition A suitable for correcting the ametropia and/or presbyopia of each eye. The mean refractive power $P_{FV}$ is obtained by summing the half value of the prescribed astigmatism value $CYL_{FV}$ to the prescribed sphere value $SPH_{FV}$: $P_{FV}=SPH_{FV} CYL_{FV}/2$. Then, the mean refractive power for each eye for proximate (near) vision is obtained by summing the prescribed addition A to the far vision mean refractive power $P_{FV}$ prescribed for the same eye: $P_{NV}=P_{FV}+A$. In the case of a prescription for progressive lenses, prescription data comprise wearer data indicating for each eye values for $SPH_{FV}$, $CYL_{FV}$ and A. In preferred embodiments, wearer prescription data PD are selected from astigmatism module, astigmatism axis, power, prism and addition, and more generally any data indicating the correction of any given vision defect. Such defect may result from a partial retinal detachment, retina or iris or cornea malformation, "Wearer eye sensitivity data" SD are known in the art. Wearer eye sensitivity data include data for spectral sensitivity (to one or more wavelengths or spectral bands); general sensitivity such as brightness sensitivity, for example for outdoors brightness sensitivity. Such data are of importance to optimize contrast for visualization of an image by the wearer.

"Wearer ophthalmic biometry data" or "biometry data" BD are known in the art. Biometry data include data pertaining to the morphology of the wearer, and typically include one or more of monocular pupillary distance, interpupillary distance, axial length of the eye, position of the centre of rotation of the eye, punctum remotum, punctum proximum, etc.

DETAILED DESCRIPTION OF THE INVENTION

Virtual Image Visualization in Accordance with the Invention

Holography techniques are known in the art. They generally involve first a step of recording on a suitable medium such as a holographic support, and then a step of reconstructing the holographic image. Recording generally involves dual illumination of the medium with a reference beam and an illumination beam. Reconstructing the holographic image can be performed by illuminating the recorded medium with the reference beam.

In broad terms, the present invention implements a recording step, but does not involve the reconstructing step as described above.

According to the invention, a recording step is used so as to record (impart) an optical function in a film F of holographic material. The resulting (recorded film) is a mirror that is used to reflect a beam from the image source, so as to cause visualization of a virtual image by the wearer.

Figure 3:
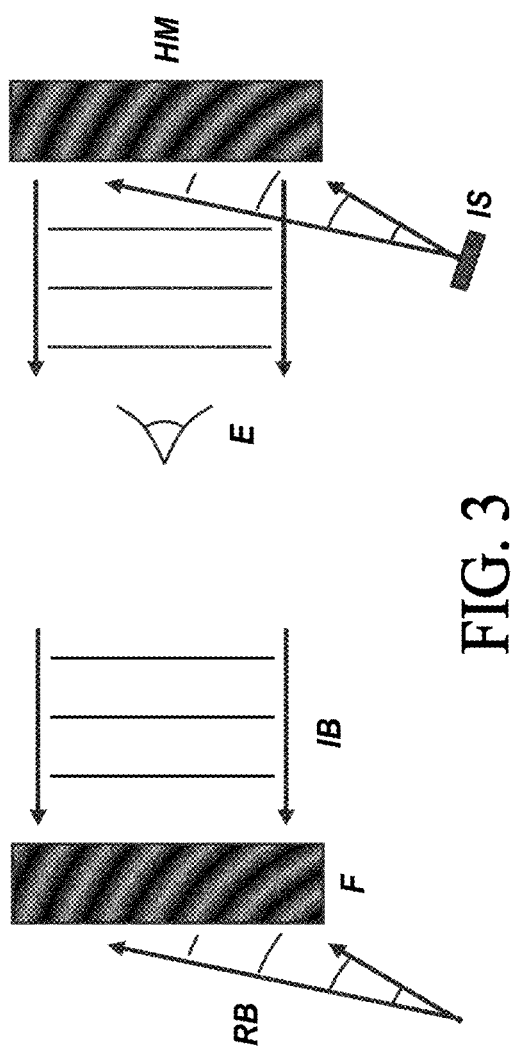
FIG. 3 shows principles for recording a holographic mirror (left) and utilization of the mirror by restitution of its optical function in virtual image visualization (right).
Figure 8:
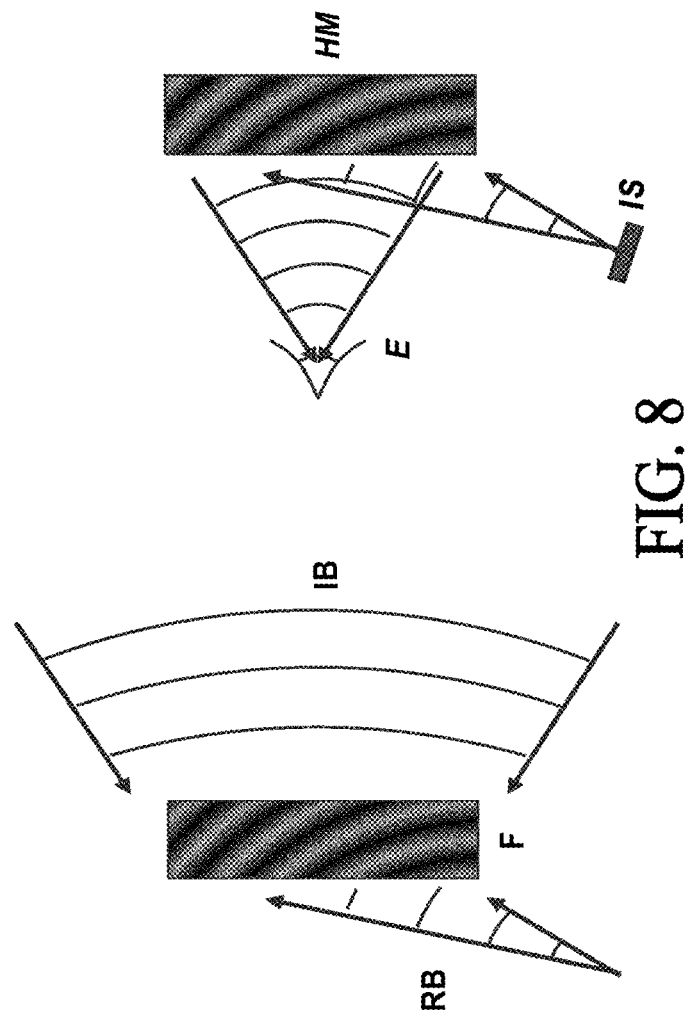
FIG. 8 shows principles for recording a holographic mirror and utilization of the mirror by restitution of its optical function in virtual image visualization.

This is illustrated by FIG. 3 and FIG. 8 wherein the holographic medium is a holographic mirror: the left part shows medium recording and the right part shows visualization of the virtual image (from the image source) by the wearer. An image source IS provides a beam that illuminates the holographic mirror. The beam from the IS is reflected on to the mirror towards an eye of a subject. In FIG. 3, the virtual image to be visualized is situated at infinite (or very large) distance of the wearer. FIG. 8 illustrates visualization of the virtual image in a situation of pupil conjugation. The virtual image is formed on the eye pupil.

Figure 4:
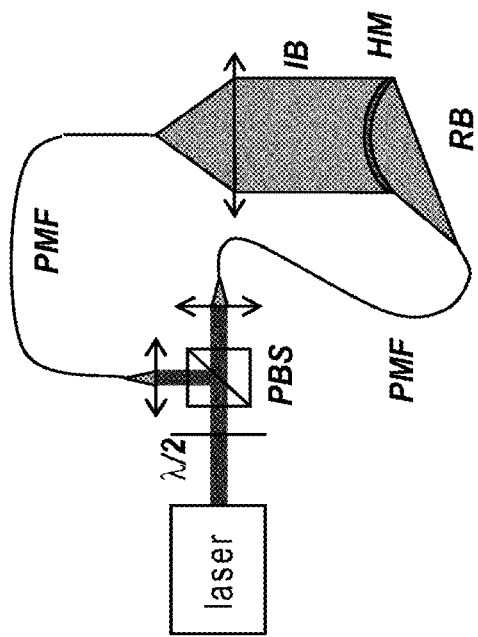
FIG. 4 shows an optical arrangement for recording a holographic mirror.
Figure 20:
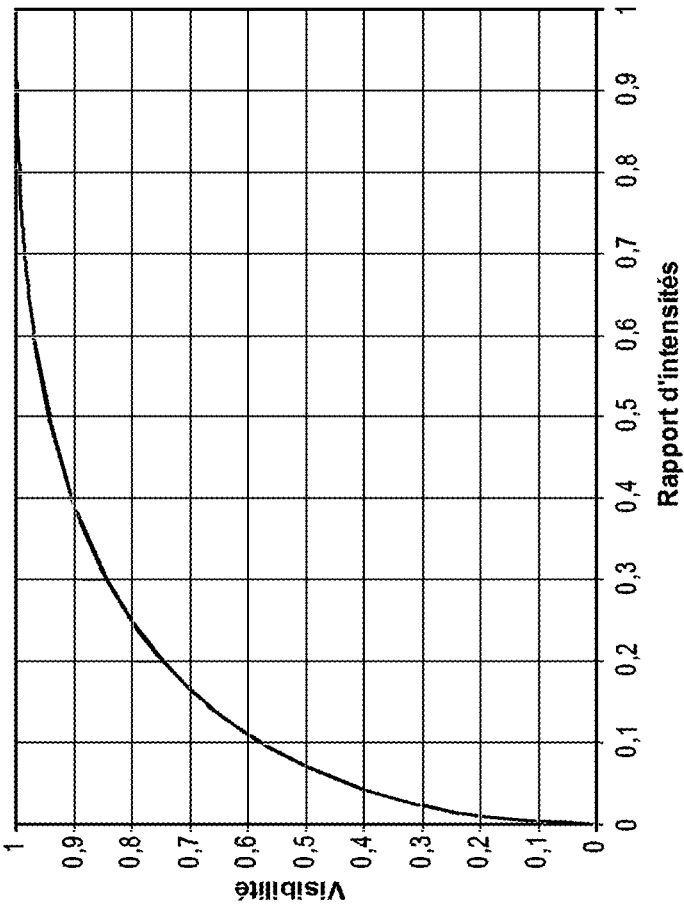
FIG. 20 shows the variation of fringe contrast as a function of the ratio of intensity between the illumination beam and the reference beam.

The recording of a mirror can be performed in accordance with an optical arrangement. An exemplary optical arrangement is shown on FIG. 4. On this figure, the recording implements a laser. A polarization beam splitter PBS allows to 'divide' the beam. References signs PMF are polarization-maintaining fibers. The split of the beam provides for two beams: a reference beam RB illuminating one side of a holographic recording medium, and an illumination beam IB illuminating the other side of the holographic medium. This allows the recording of a holographic mirror HM. Once the optical arrangement is set (e.g. geometry, sizes of the beams, etc.), features of the holographic mirror can be modified by varying one or more parameters, including the power ratio between the two beams (impacts the fringe contrast and the diffraction efficiency), the exposure time (impacts the diffraction and diffusion efficiency—see FIG. 20 that shows the variation of fringe contrast as a function of the ratio of intensity between the illumination beam and the reference beam), and the possible use of rotatable supports for the ends of the fibers (impacts the polarization of the beams when exiting the PMF fibers). Examples of parameters for an optical arrangement are shown on FIG. 19 (F: film of holographic material to be recorded, PBS: polarization beam splitter, PMF: polarization-maintaining fiber, RL: recording lens, IB: illumination beam, RB: reference beam).

In general terms, the present invention relates to systems, methods and lenses.

The present invention provides an ophthalmic lens intended to be fitted onto a frame and worn by a wearer, wherein said ophthalmic lens comprises a holographic mirror and wherein said frame comprises a build-in image source configured for illuminating said holographic mirror so as to cause, upon reflection onto said holographic mirror, the visualization of a virtual image by the wearer. The lens may be configured to correct the wearer's virtual vision.

This means that virtual vision (visualization, by the wearer, of a virtual image), results from the illumination, by the build-in image source of the frame, of the holographic mirror present in the lens. As mentioned herein, said ophthalmic lens may be configured for either an ametropic wearer or an emmetropic wearer. According to the invention, in some aspects, said ophthalmic lens is advantageously configured for correcting the wearer's ametropia for both natural vision and the visualization of said displayed virtual images. In some embodiments, the wearer's ametropia for virtual vision may be fully corrected or at least partially corrected. In some aspects: for an emmetropic wearer natural vision may not be corrected and virtual vision may be corrected, for example as a function of gaze directions and/or as a function of distance of visualization.

Figure 1:
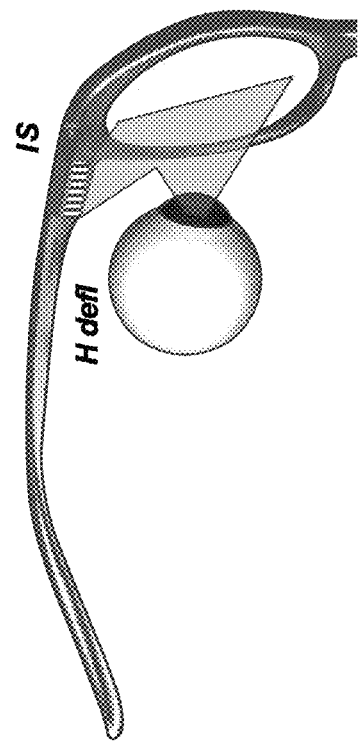
FIG. 1 shows views of pairs of eyeglasses of the invention.
Figure 1:
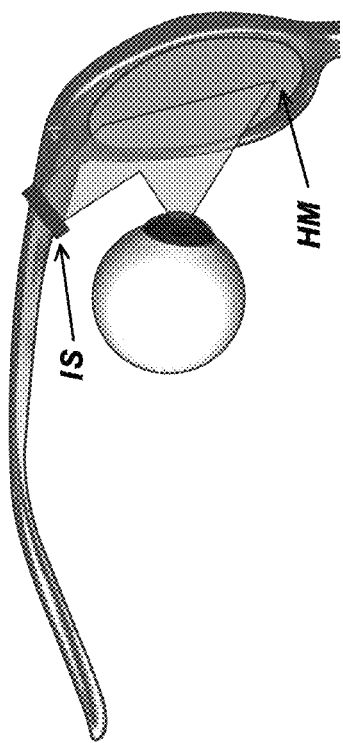
Figure 5:
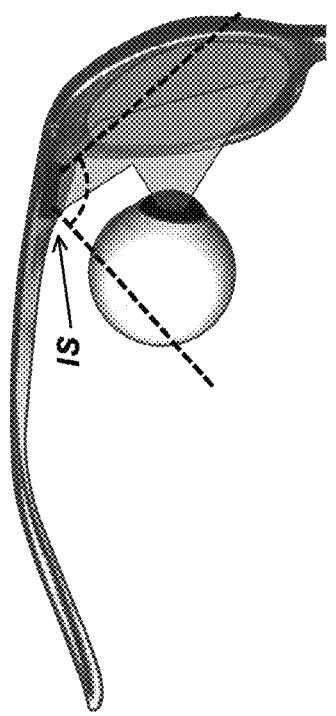
FIG. 5 shows views of pairs of eyeglasses of the invention.
Figure 5:
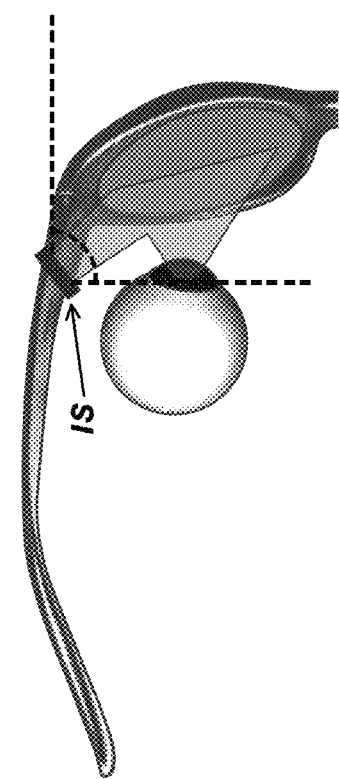
Figure 7:
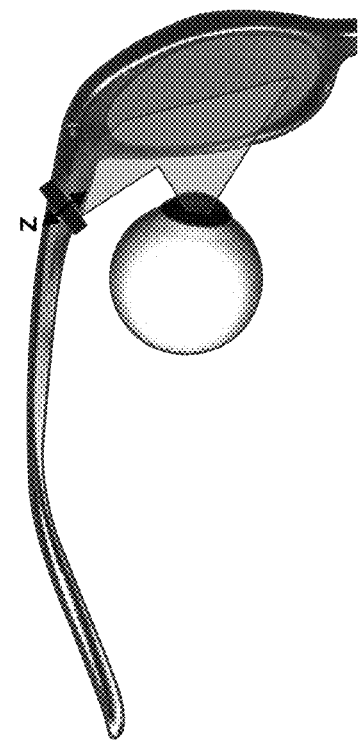
FIG. 7 shows views of pairs of eyeglasses of the invention.
Figure 7:
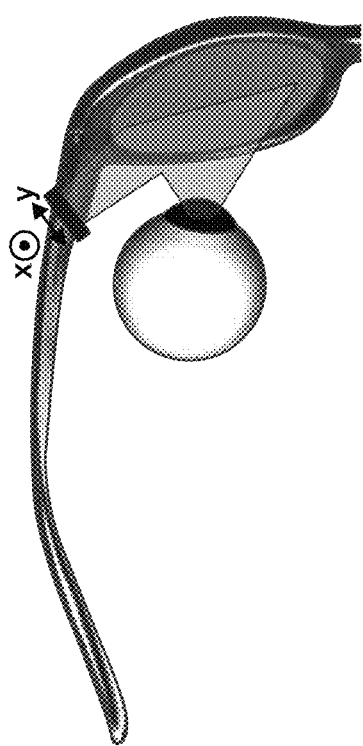
Figure 9:
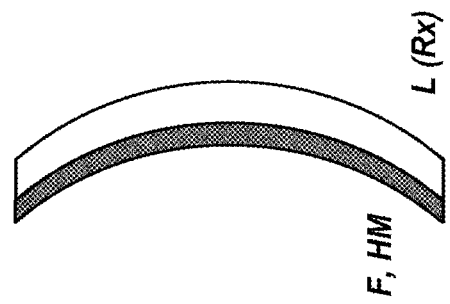
FIG. 9 shows lenses of the invention.
Figure 9:
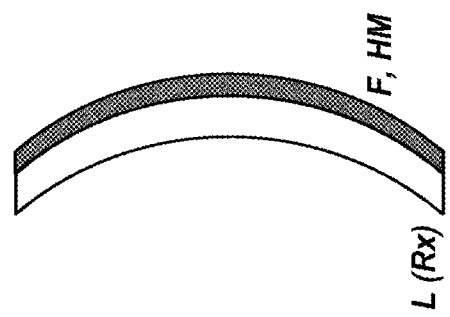

Exemplary frames with a lens of the invention are shown on FIGS. 1, 5 and 7.

The image source IS is situated on the frame, for example at the temple level, on an eyeglasses side stem. The image source IS emits a beam towards the lens. The beam is then reflected by the holographic mirror in the lens towards the eye of the wearer for visualization of the virtual image. In some embodiments, the light beam emitted from the IS may first be deflected by a holographic deflector H defl. The use of a deflector or of any other deflecting component (prism, microprism, holographic component, grid, collimating and/or deflecting lens, combinations thereof, etc.) allows to spatially configure (e.g. orient, compact, etc.) the beam from the IS.

Figure 6:
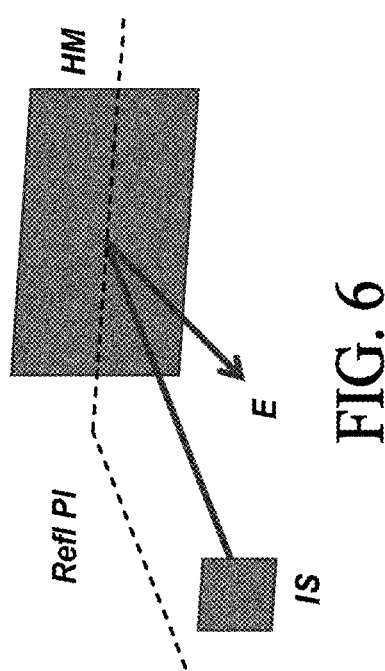
FIG. 6 shows the definition of the reflection plane of a holographic mirror.

The holographic mirror is thus-off-axis. Further, the mirror is curved, in that its optical function is 'curved': it converts a spherical wave into either a different spherical wave (for example for virtual image in near-vision), or into a planar wave (virtual image situated at the infinite). This makes it complex to provide a holographic mirror for use in an ophthalmic lens that would correct the wearer's ametropia for both natural vision and visualization of a virtual image. For example, the configuration of the frame may take into account the orientation and thus the solid angle of light emission from the IS. For example, FIG. 5 shows different orientations of the image source and illustrate the solid angle of emission of the IS (dashed lines). The configuration of the frame also defines an angle between the reflection plane of the holographic mirror and the frame. This is illustrated at FIG. 6 (Refl Pl: reflection plane, HM: holographic mirror, IS: image source, E: eye of the wearer). The lateral position of the IS (x, y on FIG. 7) with respect to the holographic mirror defines the centering of the image with respect to the gaze of the wearer. The longitudinal position of the IS (z on FIG. 7) is of importance. The location of the IS is of importance, because it directly affects the intensity of the wave reflected by the mirror, so that an incorrect positioning generates a virtual image with optical aberrations (S, C, Axis, higher-order aberrations). Such parameters should be taken into account for the configuration of the frame.

Further, it is desirable that the wearer can visualize virtual images at different distances, for example virtual images in near vision and virtual images in far vision.

Also, the lens comprising a holographic mirror may have different structures, wherein the holographic mirror HM may be situated on the eye side (rear) surface of the lens, on the front surface of the lens (opposite from the eye) or between the front and the rear surfaces (in the 'bulk') of the lens.

Thus, advantageously according to the invention, there are provided systems, lenses and methods that take into account the wearer's ametropia, notably prescription data.

According to the invention, the features of the holographic mirror may be defined 'globally' in terms of a virtual optical function. This function takes into account the light path taken by the beam, independently of the exact mechanical structure of the lens. This takes into account possible refractions in the lens, and in any event, the reflection on the HM. This approach may thus be applied for all possible lens structures, for example: light path from the IS with a single reflection on the HM (HM located on rear side of lens); or light path from the IS with a first refraction on the rear side of the lens, then reflection on the HM, then again refraction on the rear side of the lens, and then to the wearer eye (HM situated on the front side of the lens). The virtual optical function may advantageously be defined in accordance with an ergorama. Said ergorama may define the distance of visualization (D) and/or direction of visualization of said displayed virtual image by the wearer as a function of the gaze directions when wearing the frame.

Systems of the Invention

The present invention provides an ophthalmic lens supply system.

This system is for providing an ophthalmic lens intended to be fitted onto a frame and worn by a wearer, wherein said ophthalmic lens comprises a holographic mirror and wherein said frame comprises a build-in image source configured for illuminating said holographic mirror, so as to cause, upon reflection onto said holographic mirror, the visualization of a virtual image by the wearer.

The ophthalmic lens provided by the system is configured for correcting the wearer's virtual vision, According to the invention, in some aspects, said ophthalmic lens is advantageously configured for correcting the wearer's ametropia for both natural vision and the visualization of said displayed virtual images. In some aspects: for an emmetropic wearer natural vision may not be corrected and virtual vision may be corrected, for example as a function of gaze directions and/or as a function of distance of visualization.

The supply system comprises:
first processing means PM1 configured for placing an order of an ophthalmic lens, wherein said first processing means PM1 are located at a lens ordering side LOS and comprise:
inputting means IM1 configured for the input of wearer prescription data WPD,
optionally, inputting means IM2 configured for the input of frame data FD, wherein said frame data FD comprise at least one image source data LSD;
second processing means PM2 configured for providing lens data LD based upon wearer prescription data WPD, wherein said second processing means PM2 are located at a lens determination side LDS and comprise outputting means OM configured for outputting said lens data LD, and
first transmission means TM1 configured for transmitting said wearer prescription data WPD and optionally for transmitting said frame data FD, from said first processing means PM1 to said second processing means PM2.

Frame data FD may include one or more of image source data ISD (for example one or more of spatial configuration, location, distance from lens or from mirror, emission angle, etc.; also see above definition). Such data may be made from selection in a catalogue or from customized information as requested by a wearer.

In some embodiments, the supply system may further comprise third processing means PM3 configured for the input of one or more further data, such as one or more values of distance of visualization of the virtual image, data pertaining to the visualization direction, the number of areas for the HM (for example the presence of at least one area for virtual visualization in near vision and at least one area for virtual visualization in far vision; also see below)

The lens ordering side LOS is typically at the premises of an eye care professional or optician where lenses are ordered for wearers (customers).

Each of the above imputing means IM may be any inputting means configured for the input of the relevant data. Said inputting means are preferably selected for facilitated interface (e.g. may be used in connection with displaying means), and may be a keyboard from a computer such as a PC or laptop, tablet, handset, terminal, remote, etc. The lens determination side LDS is equipped with processing means that may advantageously be suitable for performing any one of the lens determination methods as known in the art.

In some embodiments, said supply system may optionally further comprise:
manufacturing means MM configured for manufacturing an ophthalmic lens based upon lens data LD and frame data FD, wherein said manufacturing means are located at a lens manufacturing side LMS, and second transmission means TM2 configured for transmitting said lens data LD from said second processing means PM2 to said manufacturing means MM, wherein said manufacturing means MM comprise means configured for recording a holographic mirror.

In some embodiments, the frame data FD may be transmitted from the LOS to the LDS and then to LMS. In some embodiments, the frame data FD may be transmitted directly from the LOS to the LMS.

The lens manufacturing side LMS is generally located in an optical lab, namely a place equipped with manufacturing means for manufacturing lenses following lens orders, based upon lens data previously obtained or generated.

Lens manufacturing means MM are known in the art, and the skilled person is familiar with suitable manufacturing means. Said manufacturing means may include one or more of surfacing including digital surfacing, polishing, edging means, etc. The lens manufacturing side LMS may comprise a combination of manufacturing means, including several different surfacing means, and/or several polishing means, etc. Means configured for recording a holographic mirror are known in the art, and are further described herein in some aspects of the invention.

The lens manufacturing side may further comprise inputting means suitable for receiving the information from said second processing means and further transmit the information to the relevant manufacturing means.

In an alternative embodiment, the supply system may further comprise:

fourth processing means PM4 wherein said fourth processing means PM4 are located at a frame ordering side LFS and comprise inputting means IM4 configured for the input of frame data FD, wherein said frame data FD comprise at least one image source data LSD; and fourth transmission means TM4 configured for transmitting said frame data FD from said fourth processing means PM4 to LOS, LDS or LMS.

The person skilled in the art is familiar with suitable transmitting means useful in the field of lens supply systems. Suitable means include electronic communications, such as by internet connections, for example via one or more servers, e-mail communication, and the like.

In one aspect of the invention, the first and/or the second and/or the third and/or the fourth processing means PM1, PM2, PM3, PM4 may be a computer entity and may comprise a memory MEM. The computer entities may be connected to each other through one or more servers. Said servers may comprise storing means in the form of a memory.

Memories are known in the art and the skilled person is familiar with memories that that suitable for implementation within a lens supply system. The memory may be suitable for storing data, such as: input data, output data, intermediate data (such as intermediate computation results). The memory may be useful as a working memory and/or to store sequence of instructions. The memory may be provided in one or more storing elements/means, and may be part of a server.

Figure 24:
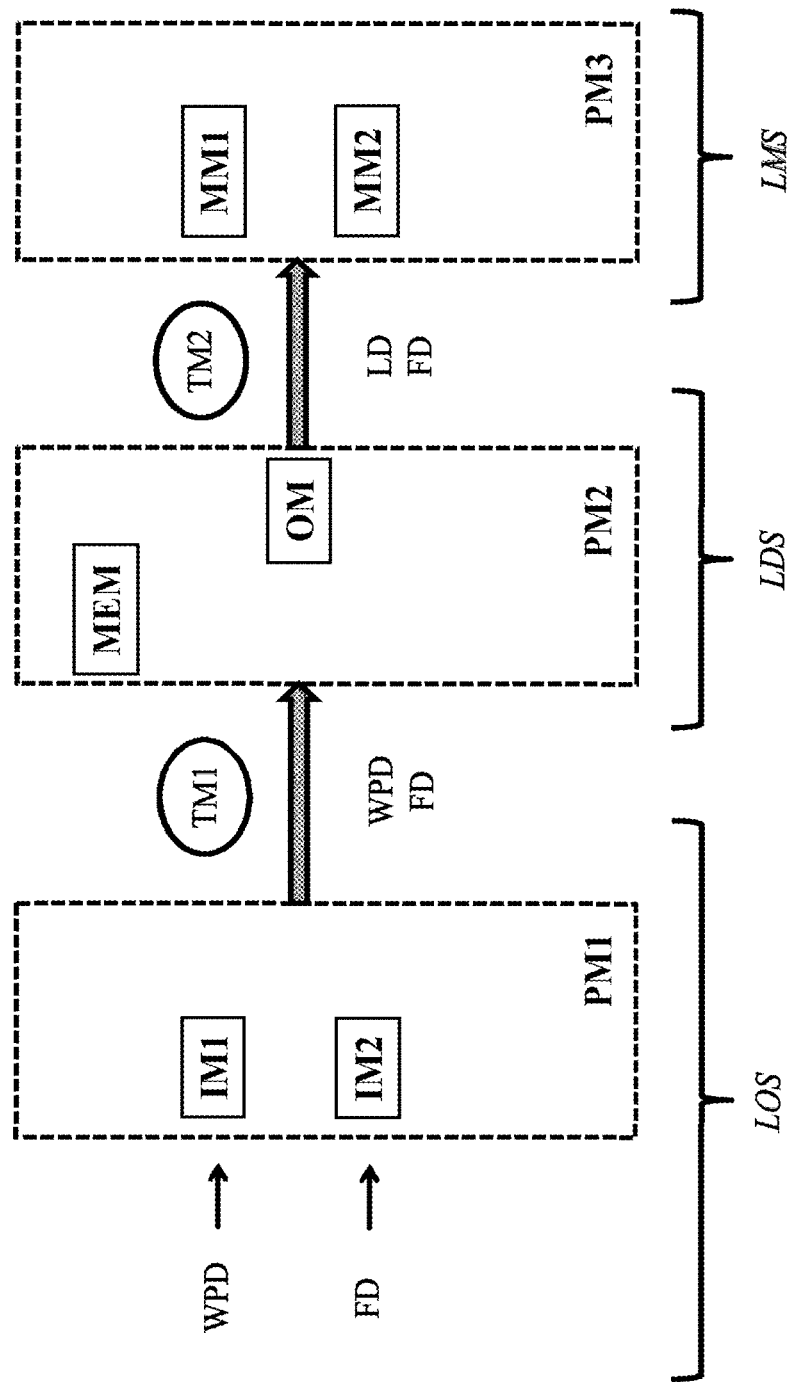
FIGS. 24-25 show supply systems of the invention.
Figure 25:
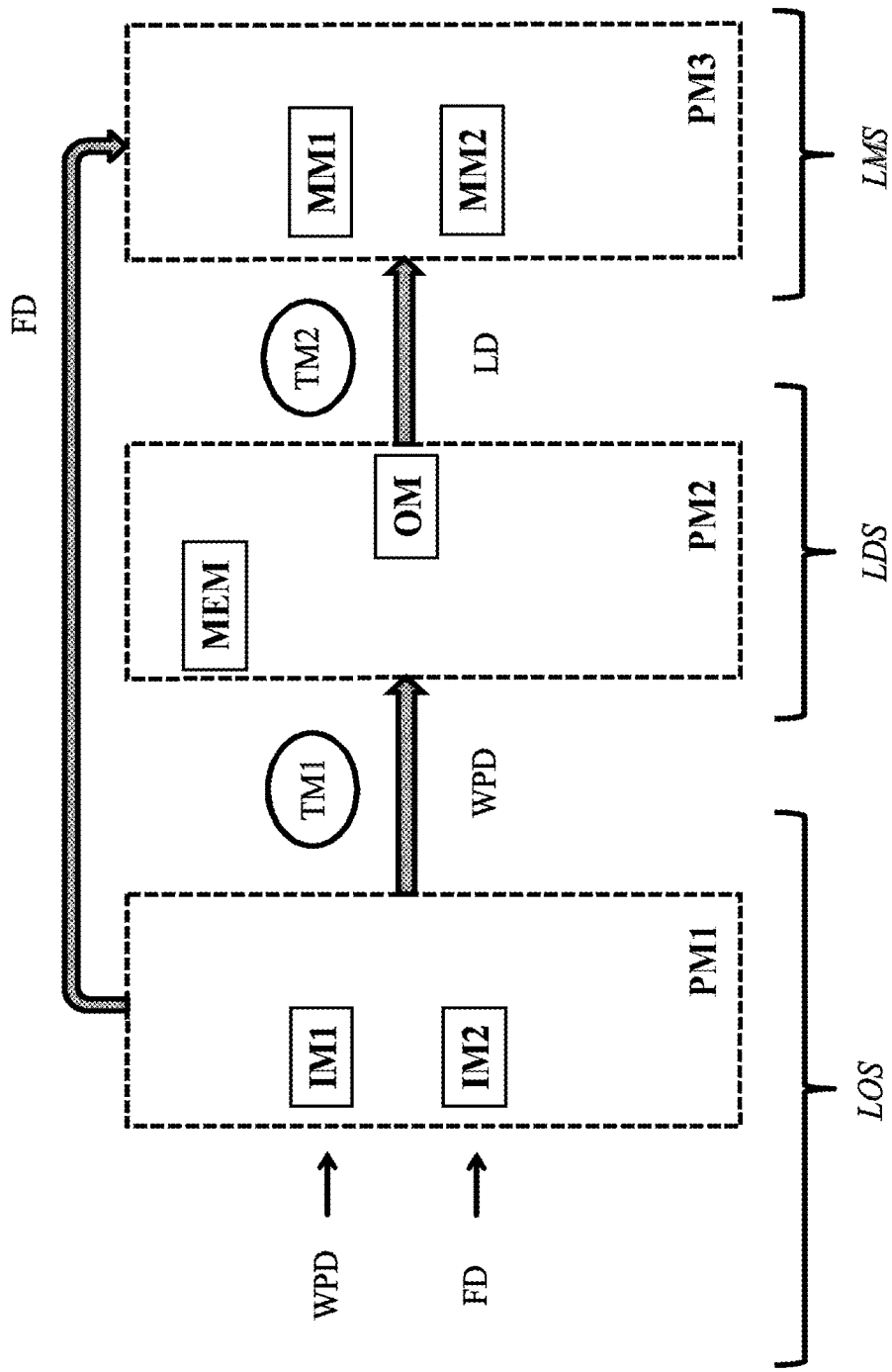

Exemplary ophthalmic lens supply systems of the invention are represented schematically at FIGS. 24-25.

Methods of the Invention

The present invention relates to a method for providing an ophthalmic lens intended to be fitted onto a frame and worn by a wearer. Said ophthalmic lens comprises a holographic mirror HM and wherein said frame comprises a build-in image source configured for illuminating said holographic mirror so as to cause, upon reflection onto said holographic mirror, the visualization of a virtual image by the wearer, wherein said ophthalmic lens is configured for correcting the wearer's virtual vision.

According to the invention, in some aspects, the wearer is ametropic and said ophthalmic lens is advantageously configured for correcting the wearer's ametropia for both natural vision and the visualization of said displayed virtual images. In some aspects: for an emmetropic wearer natural vision may not be corrected and virtual vision may be corrected, for example as a function of gaze directions and/or as a function of distance of visualization.

These methods can advantageously be implemented in a lens manufacturing method.

As disclosed herein, in some embodiments, the wearer's ametropia for virtual vision may be fully corrected or at least partially corrected.

Figure 12:
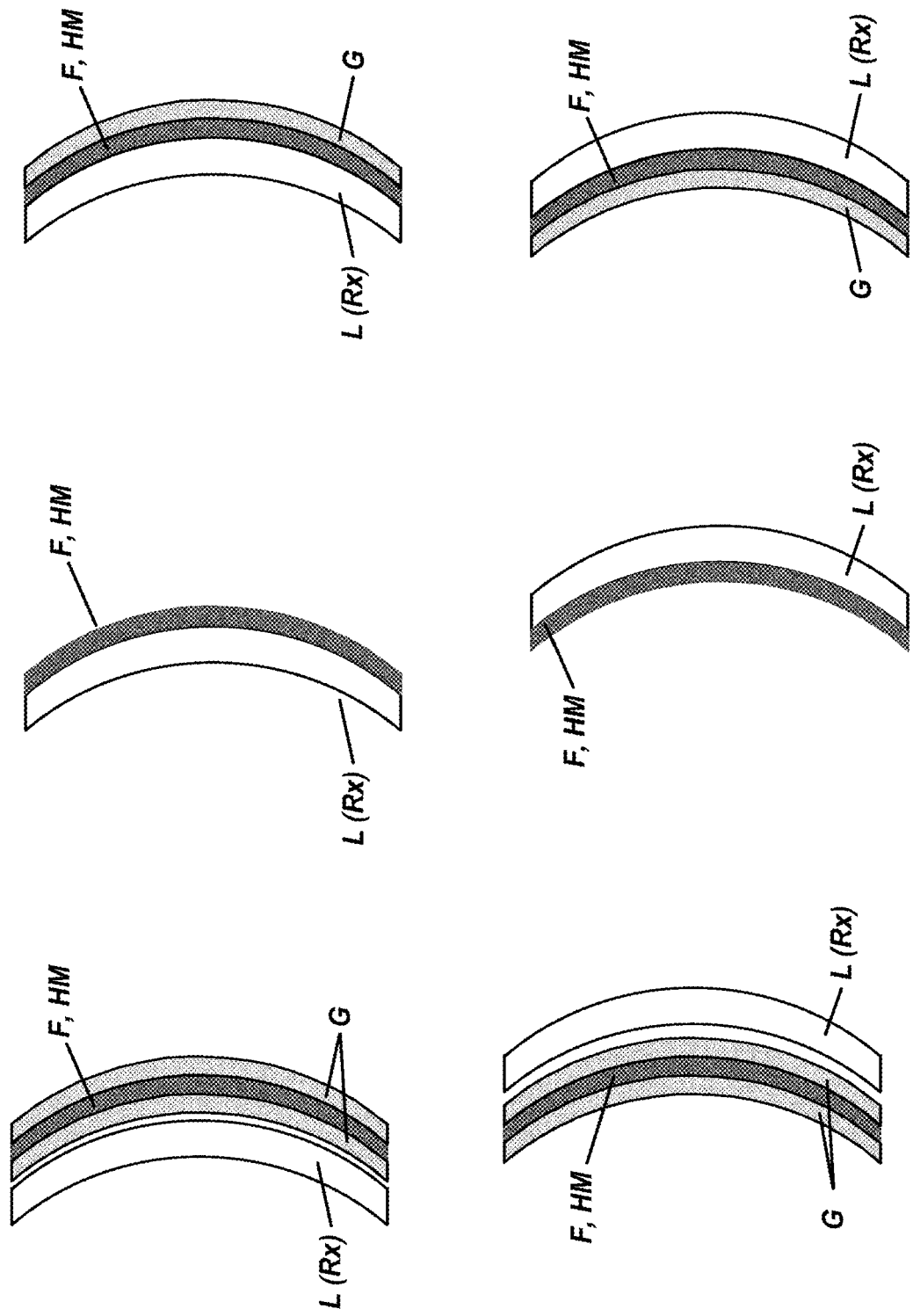
FIG. 12 shows embodiments of lenses of the invention.

In accordance with the invention, said method comprises a step (a) of providing an ophthalmic lens having a front surface and a rear surface, wherein said ophthalmic lens comprises a film F of unrecorded holographic medium. Holographic media are known in the art. Such media include dichromated gelatines and photopolymers as described herein. In some embodiments, the holographic medium may be photopolymer provided in liquid form. In such case, the film may be formed between two glass layers (walls), so as to be 'encapsulated'. Said glass layer may be provided in addition to the lens of step (a), or the lens of step (a) may play the role of one of the glass layers, or (see below) the wall of an amplitude modulation cell may play the role of one glass layer. In a preferred embodiment, the film may be 'encapsulated' between the lens of step (a) and a glass layer/wall, wherein the film may be provided either at the front surface or at the rear surface of the lens (see FIG. 12, structures shown in the right hand column). Using one glass wall instead of two makes the lens less heavy, which is advantageous. Typical glass wall thickness can be 300-2000 µm. Examples of glass layer material include organic or mineral glass. In some embodiments, the film may have a thickness of 20-30 µm (for example for dichromated gelatines) or of 5-50 µm (for example for liquid photopolymers). In some embodiments, in the ophthalmic lens of step (a), the unrecorded holographic medium is selected from dichromated gelatines and photopolymers, and the film F of unrecorded holographic medium is provided on the front surface of the ophthalmic lens, on the rear surface of the ophthalmic lens, or between the front surface and the rear surface of the ophthalmic lens. The film F may preferably be provided so as to cover the entirety of the surface of the lens (or equivalent if inserted in the bulk of the lens).

Reference is made to the description provided in the definitions above under 'holographic mirror').

In some embodiments, the ophthalmic lens of step (a) is configured for correcting the wearer's ametropia for natural vision and is selected from single-vision lenses, multifocal lenses such as bifocal lenses, and progressive addition lenses.

In some embodiments, said ophthalmic lens may optionally further comprise an amplitude modulation cell. Said amplitude modulation cell may for example be selected from electrochromic cells, polarizing cells and photochromic cells. Such cells are known in the art. Where the lens comprises a photochromic cell, it may be advantageously be such that the photochromic material does not darken during step (b) and/or does not degrade upon illumination from the LS.

Possible structures for the ophthalmic lens are depicted on FIGS. 2, 9, 12 and 14; L (Rx): lens, such as corrective lens, for example prescription lens, F: film of unrecorded holographic material, HM: holographic mirror; G: glass wall or layer; EC: electrochromic material or cell (can more generally be any amplitude modulation material or cell). As can be seen on these figures, various structures are encompassed within the present invention, and the HM may be situated at the rear surface or the front surface of the lens, optionally with one or more glass walls G and/or an EC layer or cell. All possible combinations are herein envisioned.

Further, said holographic mirror (HM) (respectively, said film (F) of unrecorded holographic medium) is provided on the front surface of the ophthalmic lens, on the rear surface of the ophthalmic lens, or between the front surface and the rear surface of the ophthalmic lens.

The method of the invention comprises a step (b) of performing holographic recording of said holographic medium by generating interference between a reference beam RB and an illumination beam IB so as to provide an ophthalmic lens comprising a holographic mirror HM, wherein the holographic recording is performed in an optical arrangement that takes into account at least the configuration of the frame.

Figure 23:
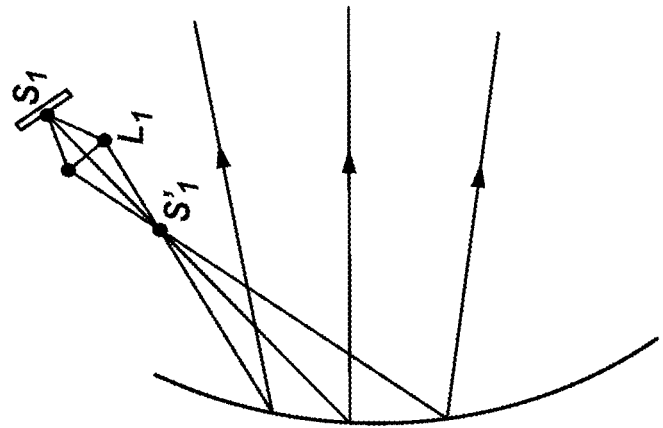

Advantageously according to step (b), the configuration of the RB mimics (simulates) the configuration of the IS on the frame, with respect to the HM in the lens fitted into the frame. In particular, the spatial configuration of the RB reflects the spatial configuration implemented for recording the mirror once the lens is fitted into the frame (orientation, distance, breadth (shape and size of zone projected on the lens), etc.). The physical location of the image source IS build-in on the frame may thus further define a secondary (re-imaged) corresponding image source (for example, image source S'1 on FIG. 23 that is imaged at a different position versus the physical position of S1, using the lens L1, that may be adjustable in position or have adjustable focal). Thus, the configuration of the IB may reflect emission from the physical image source IS, or from a secondary (re-imaged) image source.

Advantageously according to the invention, the optical arrangement of step (b) allows to provide with a holographic mirror that leads to the desired optical function, namely the holographic mirror obtained by step (b) is 'automatically' configured for providing the suitable optical function for at least partially correcting the wearer's ametropia for virtual vision through the lens.

Figure 10:
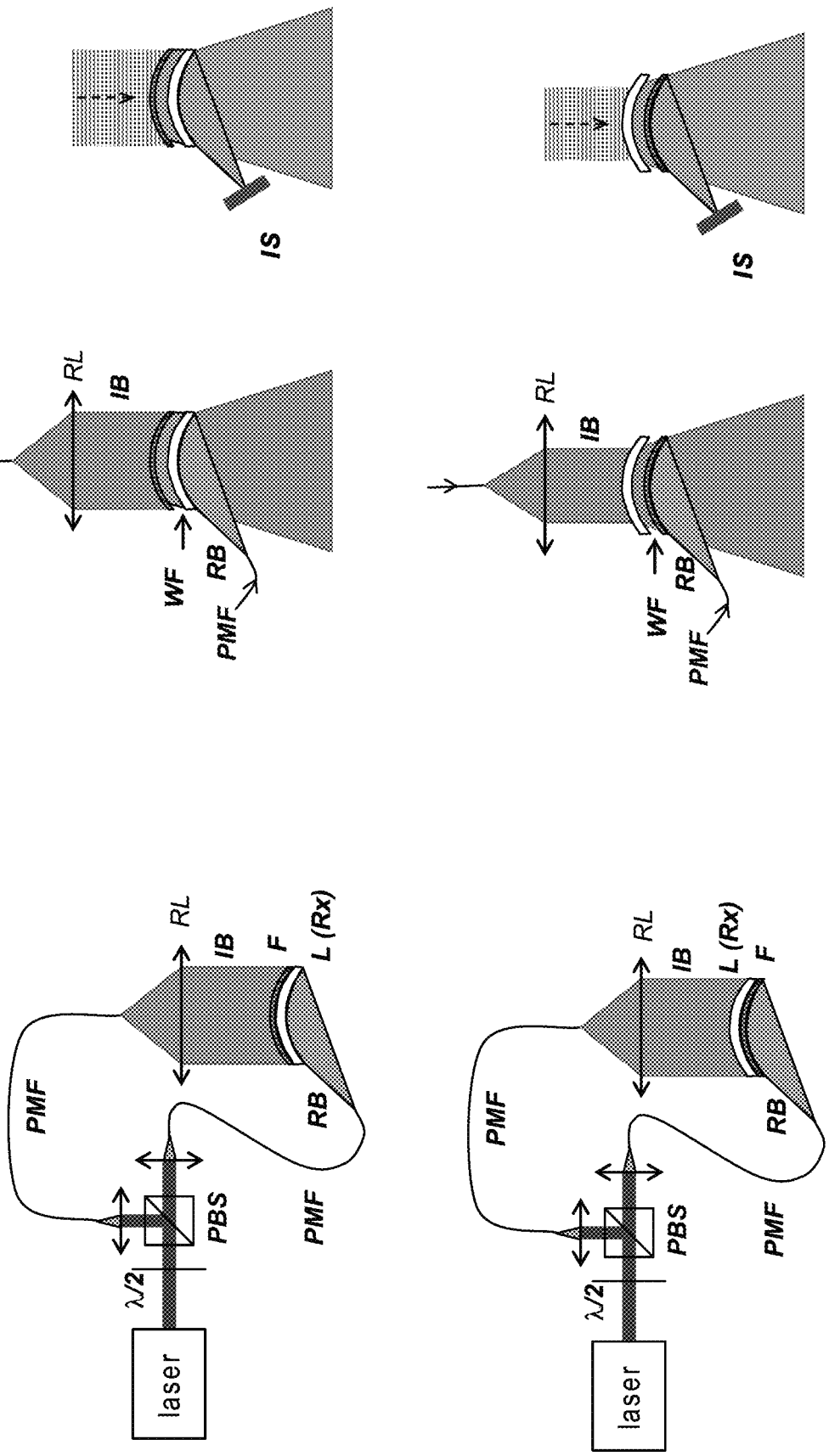
FIG. 10 shows optical arrangements for recording a holographic mirror in accordance with the invention.

See FIG. 10.

As shown on the right part of FIG. 10, for the first case where the film F is on the front side of the lens L, a light beam from the image source IS pass through the lens L and is reflected on the holographic mirror HM. The reflected wavefront WF is the same than the wavefront of the illumination beam IB, meaning that the virtual image seems to "come" from infinity, ie as the natural image. The lens corrects thus the natural vision and the vision of the virtual image at the same time. When the film F is on the rear side on the lens L, the wavefront of the illumination beam after crossing the lens L is divergent on the film F. A beam of the image source IS is thus reflected with the same wavefront than the real image seen through the lens L, and the virtual image seems to be originate from the same place than this real image. To achieve that, the lens may have a value of power identical or close to the prescription data PD of the wearer.

Figure 13:
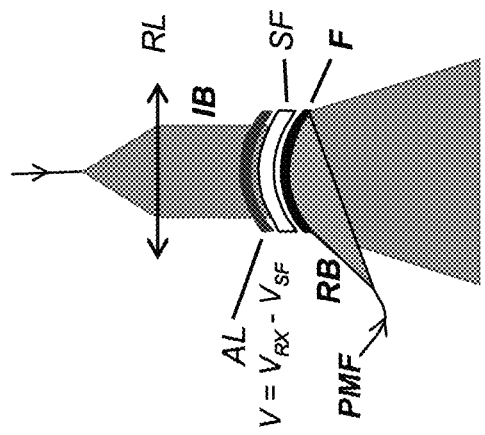
FIG. 13 shows optical arrangements for recording a holographic mirror on a semi-finished lens in accordance with the invention.
Figure 13:
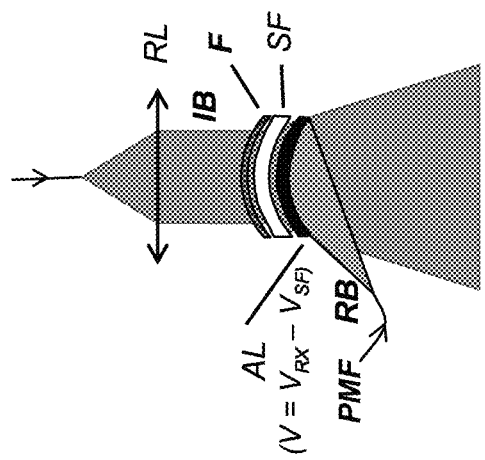
Figure 14:
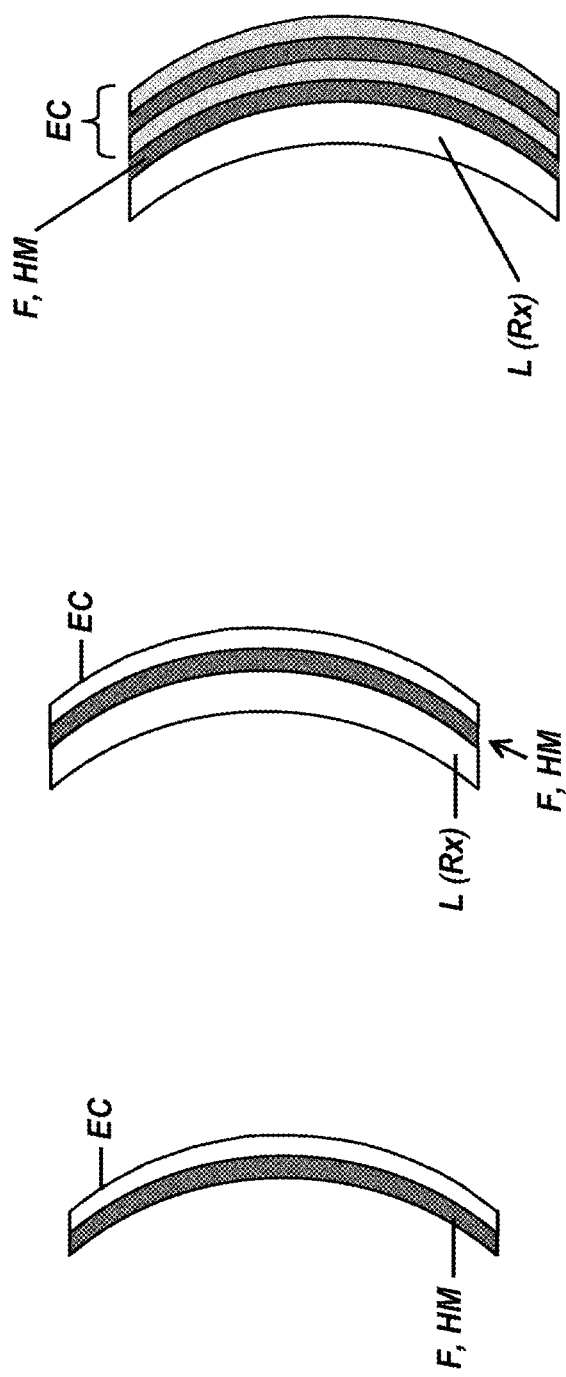
FIG. 14 shows embodiments of the invention including an electrochromic cell.

As illustrated in FIG. 13, the lens can so be the finished lens having power identical or close to PD, or a combination of a semi finished lens and a complementary lens AL, this combination having powers identical or close to PD.

In some embodiments, the method of the invention may optionally comprise a step (c) of cutting the lens obtained from step (b).

In some embodiments, the optical recording of step (b) may further take into account the distance of visualization (D) of said displayed virtual image by the wearer when wearing the frame and/or the direction of visualization of said displayed virtual image by the wearer when wearing the frame and/or the number of areas of the holographic mirror for the visualization of said displayed virtual image by the wearer when wearing the frame.

Said recording may thus be performed in accordance with an ergorama as defined herein. The ergorama defines the distance of visualization d (in dioptres δ) as a function of the gaze direction defined in an (α,β) angular system of coordinates: each gaze direction (α,β) corresponds to a given distance of visualization. Illustration of an exemplary ergorama is provided at FIG. 11*b*. For example, in near vision (α=35° and β=5°), one may have a distance of visualization of 30-50 cm.

In some embodiments, the optical arrangement of step (b) is configured such that the illumination beam IB is spatially configured with:
  one or more recording lenses RL, RL1, RL2 selected from
    unifocal lenses, multifocal lenses such as bifocal lenses, and progressive addition lenses, or a lens matrix LM, or an active lens with phase modulation and
  optionally an opaque mask M.

Active lenses with phase modulation include deformable optical systems, such as fluidic systems, piezoelectric mirrors, transmission SLMs, and more generally systems with variable (tunable) power.

Advantageously according to the invention, one or more recording lens RL and/or one or more mask M may be used to spatially configure the IB that illuminates the HM. This provides for the differential and/or sequential recording of defined areas in the HM. See for example FIGS. 16-18.

In some embodiments, the optical arrangement of step (b) is configured such that:
  the reference beam RB simulates the beam of the build-in image source to be used for illuminating said holographic mirror so as to cause the display of the virtual image to be visualized by the wearer when wearing the frame, and
  the illumination beam IB is configured so as to define
    the distance of visualization D of said displayed virtual image by the wearer when wearing the frame and/or
    the direction of visualization of said displayed virtual image by the wearer when wearing the frame and/or
    the number of areas of the holographic mirror for the visualization of said displayed virtual image by the wearer when wearing the frame.

The distance of visualization D may be infinite (very large) or finite.

In some embodiments, the optical arrangement of step (b) is such that the illumination beam IB is configured so as to differentially record a plurality of areas A1, A2, NV, FV on the film F of unrecorded holographic medium. In such case, each area A1, A2; NV, FV may correspond to equal or distinct values of distance of visualization D; D_nv, D_fv of said displayed virtual image by the wearer and/or may correspond to equal or distinct directions of visualization of said displayed virtual image by the wearer. The variation from one to another area (in terms of acuity correction) may be continuous (progressive) or not. See for example FIG. 16.

In some embodiments, as explained above, the optical arrangement of step (b) is such that the illumination beam IB is configured in accordance with an ergorama, wherein said ergorama defines the distance of visualization D and/or direction of visualization of said displayed virtual image by the wearer as a function of the gaze directions when wearing the frame. The definition of said ergorama may include at least gaze directions in the vertical direction and/or gaze directions in the horizontal direction (β=constant and/or α=constant). See for example FIG. 11b. The ergorama may also be defined differently according to the gaze directions of interest, corresponding to the areas of interest on the lens.

In some embodiments, said method is a method for providing a progressive addition lens (respectively a multifocal lens such as a bifocal ophthalmic lens, respectively a single-vision lens), wherein the ophthalmic lens of step (a) is a progressive addition lens (respectively a multifocal lens such as a bifocal ophthalmic lens, respectively a single-vision lens), and wherein the holographic recording of step (b) is performed so that the holographic mirror HM comprises at least an area for near vision NV and an area for far vision FV corresponding to distinct values of distance of visualization D_nv, D_fv of displayed virtual image by the wearer. See for example FIG. 17.

Advantageously, the method of the invention provides lenses (e.g. unifocal, multifocal such as bifocal, progressive addition)) that provide for dual virtual vision, with the HM mirror specifically configured to comprise at least an area for virtual near vision and at least an area for virtual far vision.

In some embodiments, the method provides a lens that comprises a amplitude modulation cell as described herein, such as an electrochromic cell. See for example illustrative optical arrangements in FIG. 15.

In some embodiments, said method may be a method for providing a single-vision lens (respectively a multifocal lens such as a bifocal lens, respectively a progressive addition lens), wherein the ophthalmic lens of step (a) is a semi-finished lens blank SF, wherein the optical arrangement of step (b) includes the implementation of an auxiliary single-vision lens AL (respectively an auxiliary multifocal lens such as a bifocal lens, respectively an auxiliary progressive addition lens) whose optical power takes into account the optical power required to correct the wearer's ametropia and the optical power of the semi-finished lens blank, and wherein the auxiliary single-vision lens AL (respectively an auxiliary multifocal lens such as a bifocal lens, respectively an auxiliary progressive addition lens) is for spatially configuring the reference beam RB or the illumination beam IB. See for example FIG. 13.

As an alternative to implementing an auxiliary lens (AL), it is possible to directly change the wavefront coming from IB or RB using an active lens with a modulation phase, for example a varying power lens using adaptive optics technics.

In some embodiments, the IB is such that it covers an extended field on the lens. See for example FIG. 16.

The methods of the invention are illustrated on the following figures:

FIG. 10 shows optical arrangements for recording a holographic mirror in accordance with the invention, and the utilization of the mirror in the frame/restitution of the optical function of the holographic mirror for (corrected) virtual image visualization. At the left are illustrations of optical arrangements. By recording (center of figure), the wave front WF is deformed between the lens of step (a) and the film F. The reconstruction of the virtual image is shown on the right with illumination from the IS. The F may be at the front surface (top) or rear surface (bottom) of the lens of step (a).

Figure 11A:
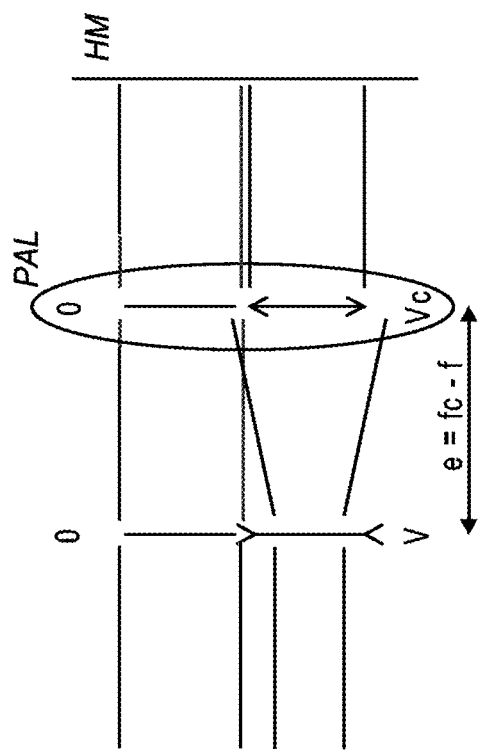
FIG. 11 shows embodiments pertaining to a progressive addition lens of the invention (11a) and an illustration of an ergorama (11b).
Figure 11A:
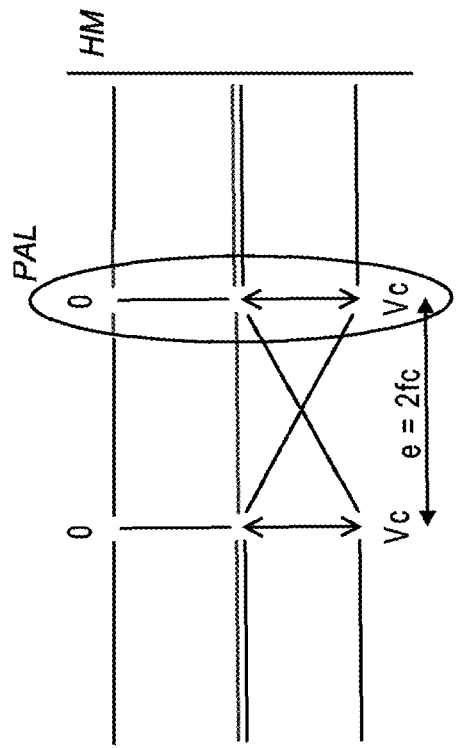
Figure 11B:
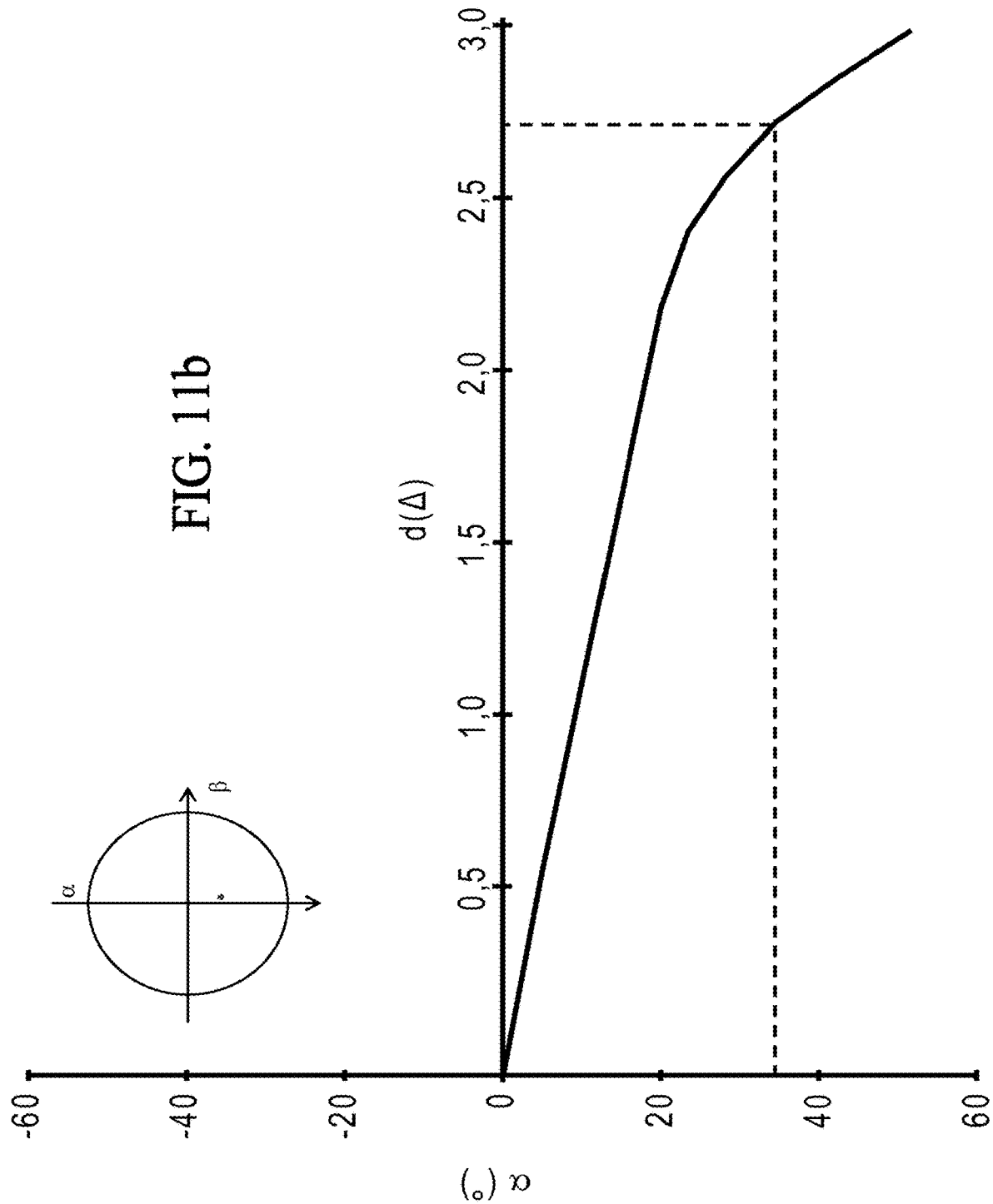

FIG. 11a shows embodiments pertaining to a progressive addition lens for a presbiopic wearer having no more accommodation capability. If the wearer cannot accommodate or very little accommodate, this will decrease tolerance values for suitable focus distances. The simplest case is that of a non-myopic but presbyopic wearer. S/he has a prescription for a plano lens and a positive addition (Vc). In this case, it is necessary for the image reflected by the mirror to be visualized at infinite distance regardless of the lens area (gaze direction). In the optical arrangements of FIG. 10, the area with the addition does not allow for a reflected image to be directly situated at infinite distance. It is therefore advantageous to "neutralize" this addition for the recording of the HM. One 'simple' possibility is to have two identical lenses (Rx for prescription and its counterpart). Recording may be performed with these two lenses. The Rx lens may be arranged directly on or below the plane of the film F/holographic mirror HM (or in another embodiment, the holographic mirror/film HM/F may be directly attached to the prescription lenslens that will be lens provided to the wearer), and the second lens may be at a distance equal to the sum of the focal additions (FIG. 11a left). This is achieved with the assembly of FIG. 10 (bottom right). Another possibility is to use a plano/divergent progressive lens, with a plano part corresponding to the plano part of the prescription lens, and a divergent part such that its focal length (f) and the distance (e) to the lens meets the equation f=fc−e, where fc is the focal length of the addition (FIG. 11a right). To change the prescription lens, it is possible to simply adjust the distance between the lens and the gradual plano/divergent lens, or to keep this distance constant, but change the progressive lens.

FIG. 13 shows optical arrangements for recording a holographic mirror on a semi-finished lens in accordance with the invention. Depending on the relative location of the film F of holographic medium (either front surface or rear surface of the semi-finished blank SF, the auxiliary lens AL is positioned respectively at the rear surface or front surface of the semi-finished lens. In this embodiment, one requires the value of prescription for which that SF will be used. This is thus particularly advantageous for SV lenses. For recording, one may take into account both the power of the SF and the prescription value Rx intended to be achieved. If the SF has a power $V_{SF}$ and the desired power value is $S_{RX}$, one may add a lens (auxiliary lens. AL) with a power V such that $V=V_{RX}-V_{SF}$ (provided that the distance between the SF and AL is small compared to the focal of these glasses). This applies to both arrangements (see FIG. 13).

Figure 15:
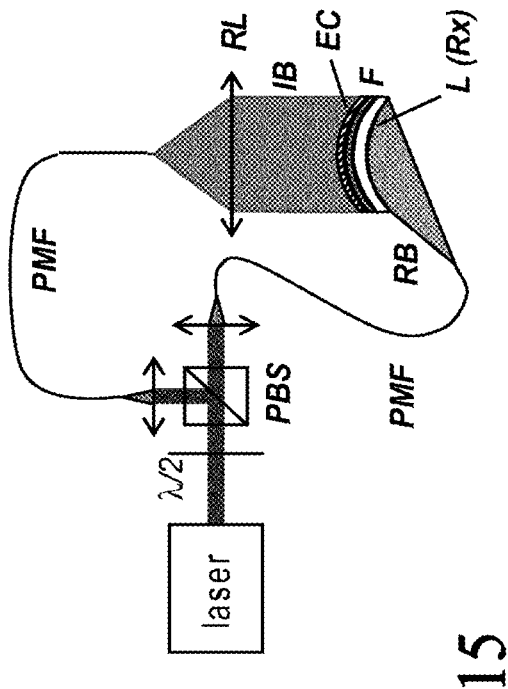
FIG. 15 shows optical arrangements for recording a holographic mirror on a lens comprising an electrochromic cell in accordance with the invention.

FIG. 15 shows optical arrangements for recording a holographic mirror on a lens comprising an electrochromic cell in accordance with the invention. The presence of an electrochromic cell EC does not affect the recording, and it may be present during recording. Advantageously, the film F may be formed ('sandwiched') between the lens of step (a) and the EC cell.

Figure 16:
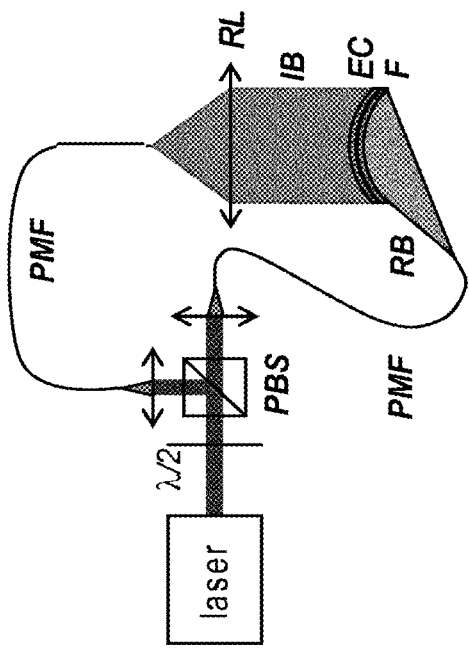
FIG. 16 shows an optical arrangement for recording a holographic mirror with an extended field on a lens in accordance with the invention.
Figure 16:
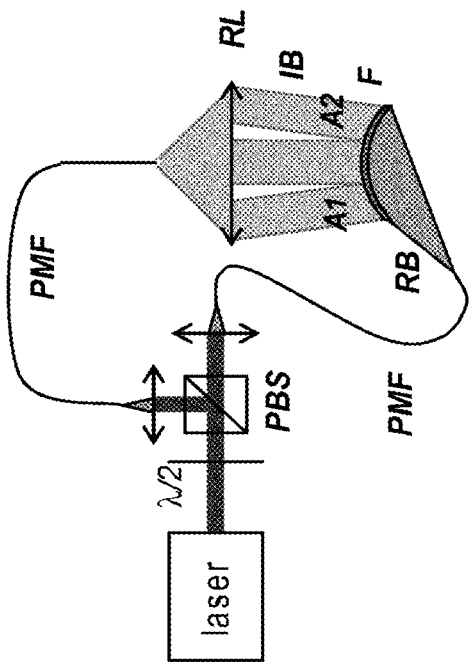

FIG. 16 shows an optical arrangement for recording a holographic mirror with an extended field on a lens in accordance with the invention. The extended field may allow to cover the entirety of the lens surface, whereby the entirety of the lens surface is illuminated by the IB beam. The IB beam may be configured so as to define several areas A1, A2 on the film/mirror F/HM. This is advantageous in that it provides for virtual vision in several gaze directions, corresponding to the respective areas of the film/mirror/lens.

Figure 17:
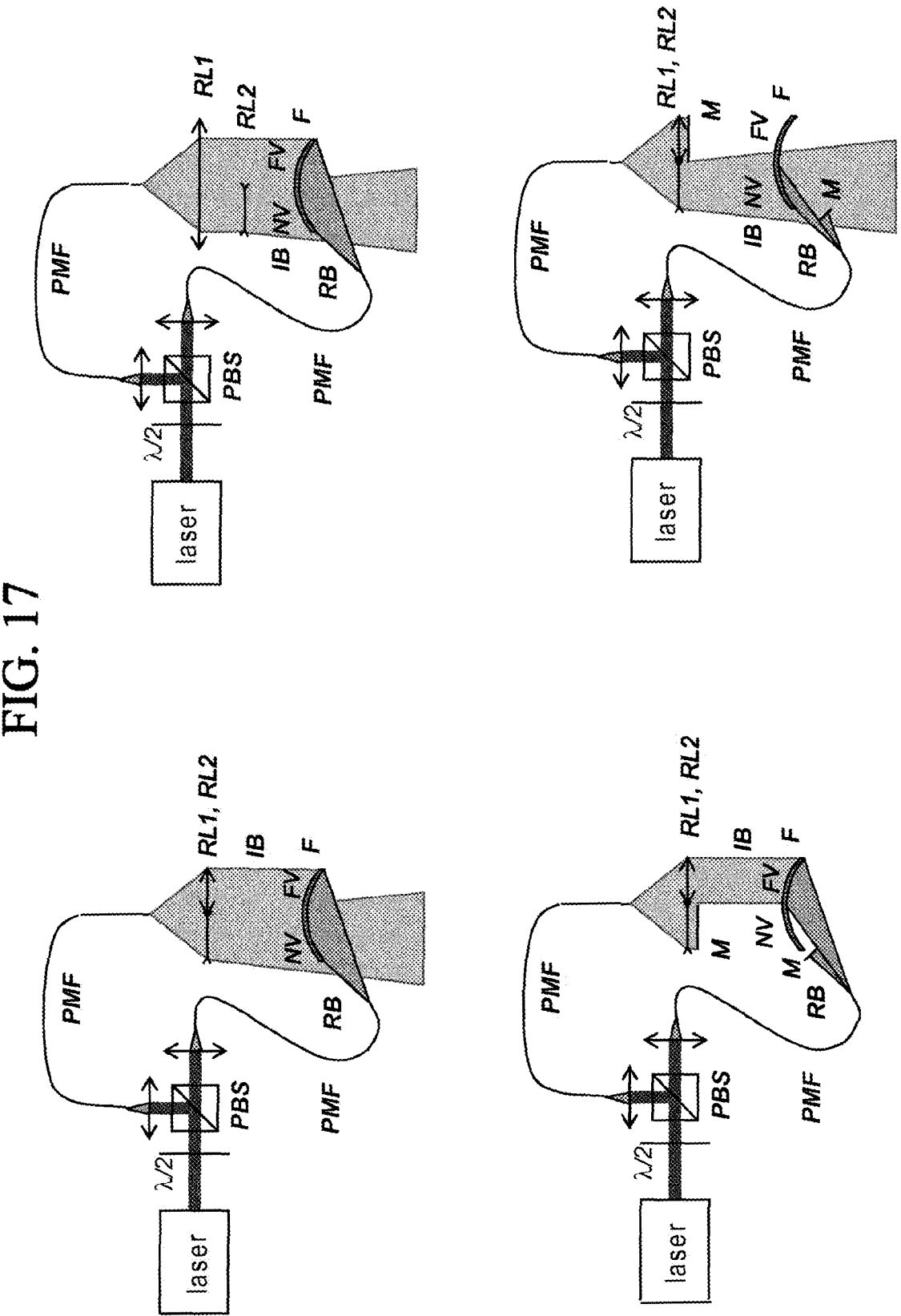
FIG. 17 shows an optical arrangement for recording a holographic mirror in accordance with the invention.

FIG. 17 shows optical arrangement for recording a holographic mirror on a lens in accordance with the invention (lens of step (a) not shown). This illustrates the implementation of one or more recording lenses RL, possibly in combination with one or more masks, to spatially configure the illumination beam IB and/or the reference beam RB. This advantageously allows to record areas of the film F on a differential basis, and in particular to record differentially and/or sequentially at least two distinct areas, such as at least one area for near vision NV and one area for far vision FV. This method is useful for any type of lens at step (a). In particular, the lens of step (a) may be a plano. In such case, it provides a lens that is suitable for an emmetropic wearer, wherein the lens provides for a virtual vision with suitable focus distance/s as a function of the gaze direction.

Figure 18:
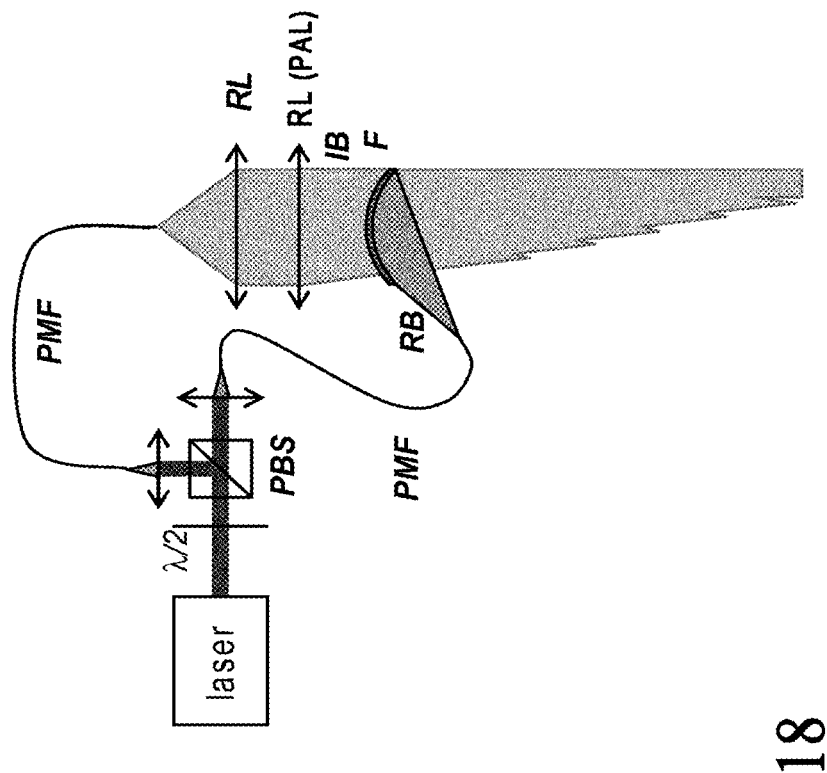
FIG. 18 shows optical arrangement for recording a holographic mirror on a lens in accordance with the invention.
Figure 18:
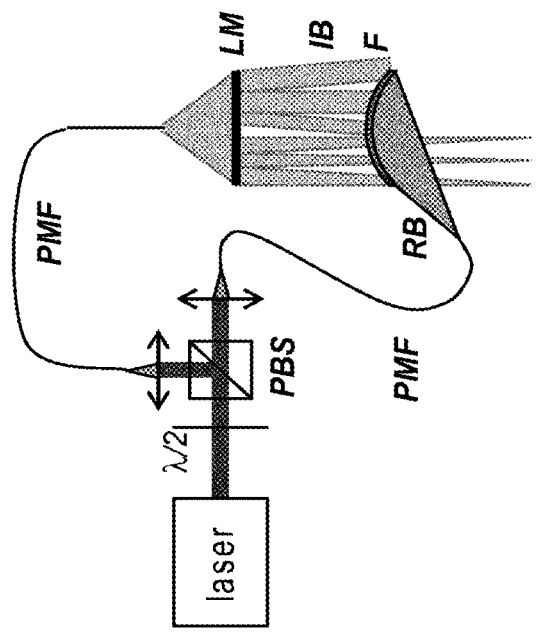

FIG. 18 shows optical arrangement for recording a holographic mirror on a lens in accordance with the invention. The lens matrix LM also allows to differentially record areas of the film, for example with a divergent matrix used to generate the illumination beam for the near vision area (left). It is also possible to use a progressive addition lens PAL as a recording lens RL. This advantageously provides for a progressive focus distance to be implemented. This also advantageously provides for a lens to be worn by an emmetropic wearer, wherein the lens of step (a) can be a plano. For example, it is possible to use a divergent PAL to record the near vision NV area of the film F.

Lenses of the Invention

The present invention provides an ophthalmic lens for correcting at least partially the wearer's vision for the visualization of a displayed virtual image, wherein said ophthalmic lens comprises a holographic mirror HM or a film F of unrecorded holographic medium.

In some embodiments, the lens may be configured for correcting a wearer's ametropia in natural vision and/or virtual vision. In some embodiments, the wearer may be emmetropic, and the lens is such that it provides for corrected virtual vision. This may for example be desirable for a wearer who, despite being emmetropic, lacks sufficient reserves for accommodation. Thus, in some aspects: for an emmetropic wearer natural vision may not be corrected and virtual vision may be corrected, for example as a function of gaze directions and/or as a function of distance of visualization.

In some embodiments, said ophthalmic lens may be selected from single-vision lenses, multifocal lenses such as bifocal lenses, progressive addition lenses and semi-finished lens blanks.

In some embodiments, said ophthalmic lens is intended to be fitted onto a frame and worn by said wearer.

In some embodiments, said ophthalmic lens comprises a holographic mirror HM and said frame comprises a build-in image source configured for illuminating said holographic mirror, so as to cause, upon reflection onto said holographic mirror, the visualization of a virtual image by the wearer, wherein said ophthalmic lens is configured for correcting at least partially the wearer's ametropia for the visualization of said displayed virtual image. The fact that the wearer's ametropia may not be fully corrected is illustrated below (example 2). The corresponding 'tolerance' values of the examples may apply to all lenses of the invention.

In some embodiments, said holographic mirror HM is made from a material (respectively, said holographic medium is) selected from dichromated gelatines and photopolymers. Said material and medium are as disclosed herein.

In some embodiments, said holographic mirror HM (respectively, said film F of unrecorded holographic medium) is provided on the front surface of the ophthalmic lens, on the rear surface of the ophthalmic lens, or between the front surface and the rear surface of the ophthalmic lens. Possible structures for the ophthalmic lens are depicted on FIGS. 2, 9, 12 and 14. All possible combinations thereof are herein envisioned. In this respect, the stacking structure may be any stacking structure as described herein.

In some embodiments, said ophthalmic lens optionally further comprises an amplitude modulation cell, for example selected from electrochromic cells, polarizing cells and photochromic cells, as described herein.

In some embodiments, the ophthalmic lens is a progressive addition lens (respectively a multifocal lens such as a bifocal ophthalmic lens, respectively a single-vision lens), and the holographic mirror HM comprises at least an area for near vision NV and an area for far vision FV corresponding to distinct values of distance of visualization D_nv, D_fv of displayed virtual image by the wearer. D_nv and D_fv may have equal or different values. The variation in distance from NV to FV may be continuous or not. Correspondingly, the power variation for virtual vision may vary in a continuous fashion or not. This may be illustrated in particular by FIG. 17.

In some embodiments, the holographic mirror HM may comprise at least an area for near vision NV and an area for far vision FV, and the holographic mirror (HM) may be configured so that it has an addition with a negative value, wherein the addition of the holographic mirror is defined as the difference:

$$P\_NV - P\_FV$$

wherein P_NV is the optical power for near vision and P_FV is the optical power for far vision. The optical power of the holographic mirror is defined as the curvature, expressed in dioptres of the wavefront after reflexion onto the holographic mirror and after exiting the lens, from a point in the image source. A concave curvature refers to a positive value of power, while a convex curvature refers to a negative value of power.

In some embodiments, the absolute value of (P_NV−P_FV) decreases as the prescribed value of addition increases.

For the lenses of the invention, reference is also made to FIGS. 2, 9, 11, 12, 14 and 21-22.

Pairs of Eyeglasses and HMDs of the Invention

The present invention also provides eyeglasses (spectacles) as well as more generally head mounted devices. Said devices and eyeglasses comprise at least one lens according to the invention, or at least one lens obtained in accordance with the invention, as described herein.

FIGS. 1, 5 and 7 show exemplary eyeglasses according to the invention.

All embodiments of lenses, methods, eyeglasses, HMDs and systems herein described (including figures) may be partially or fully combined with each other.

The invention is illustrated by the following non-limiting examples.

EXAMPLES

Example 1: Method and Lens of the Invention

Figure 19:
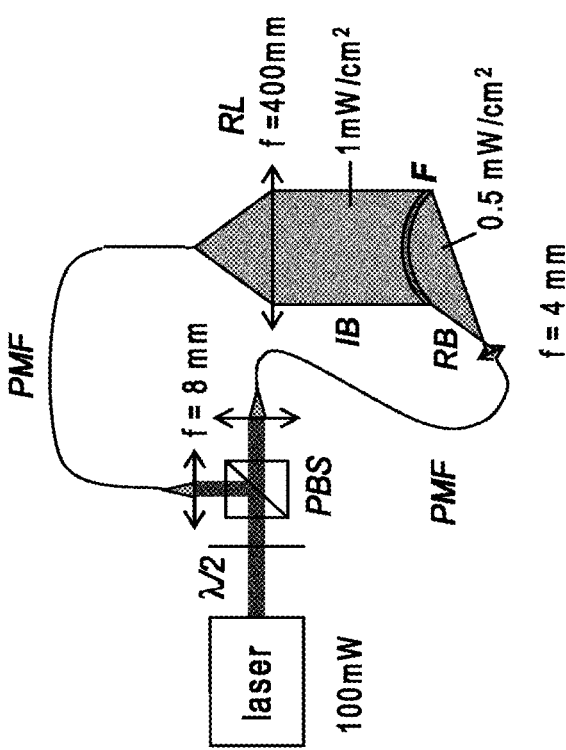
FIG. 19 shows an example optical arrangement for recording a holographic mirror on a lens in accordance with the invention.

FIG. 19 shows an example optical arrangement for recording a holographic mirror on a lens in accordance with the invention. In this example the laser emits at 532 nm.

PMF is a polarization-maintaining fiber (460-HP Nufern): panda fiber, core diameter 2.5 µm, ON 0.13, mode diameter: 3.5 µm @ 515 nm.

The lens of step (a) is not shown.

The lens is as follows: power −3δ, front surface radius 87 mm, shape eyeglasses lens 40×50 mm or round diameter 70 mm. Stacking of layers is as per FIG. 12, top left.

The film F is as follows: diameter 70 mm, radius of curvature 87 mm, glass layer thickness 850 µm, photopolymer F thickness 5 to 50 µm (e.g. 40 µm) thanks to spacers, total stacking thickness ~1.65 mm, exposure time: 30 s to 10 min depending upon nature of photopolymer.

Depositing the film F for a lens of 70 mm diameter:
- depositing a 50 µL drop onto a glass layer (spacers: 5-50 µm, glass layer: thickness 500 µm; radius of curvature 87 mm, round diameter 70 mm; anti-reflection treatment or coating, especially 532 nm),
- positioning second glass layer; tightening,
- leave at rest for 20 min onto the illumination support member.

Illumination for 30 s to 6 min, as a function of the beam intensity (e.g. see FIG. 20), nature and thickness of photopolymer.
- Bleaching by exposition to visible light for 15 min (e.g. halogen lamp, 50 to 75 W).
- Sealing with glue if necessary.

During illumination:
- protect from physical disturbance (air movements, mechanical vibrations, dust, etc.)
- stabilized temperature (avoid air convection)
- black room (dark room: for example inactinic lighting for recording green light)
- coating (anti-reflection) onto glass (avoiding parasite reflections).

Characterization:
- Spectral (wavelength for reflection and mirror efficiency)
- Qualitative optical properties (observe an OLED screen)
- Quantitative optical properties (wave front analysis).

It is possible to combine with an EC cell.

Example 2: Lenses of the Invention

The present example relates to a finished or semi-finished lens. Situation 3B below may apply for a finished lens or a combination of a semi-finished lens with an auxiliary lens (AL) with a progressive surface.

The below features generally illustrate that, according to the invention, ametropia may be either partially or fully corrected for virtual vision.

1. Spherical Power in a Far Vision Zone

If the lens has a spherical power $S_v$ in a far vision area, then the recording of the holographic mirror may be such that the wave front after reflection on the holographic mirror and exiting the lens (refraction) has a spherical power $S_h$ close to $S_v$, in the far vision region.

In practice, this power value $S_h$ power may
- be less than the power $S_v$, within a magnitude not exceeding 2δ (this therefore may impose a value of wearer accommodation of 2δ, because the virtual image will be visualized at a distance of 50 cm=1/(2δ)).
- not exceed $S_v$ by 1δ (eye field depth of field)

Thus: $S_v \approx S_h$, preferably $S_v - 2\delta \leq S_h \leq S_v + 1\delta$.

This applies preferably for a configuration wherein the image source point is at a fixed location (FIGS. 21 and 22) but also in the case where the source point is imaged with an adjustable position lens L1, in this case one can envision to partially correct the spherical prescription by adjusting the focus.

Figure 21:
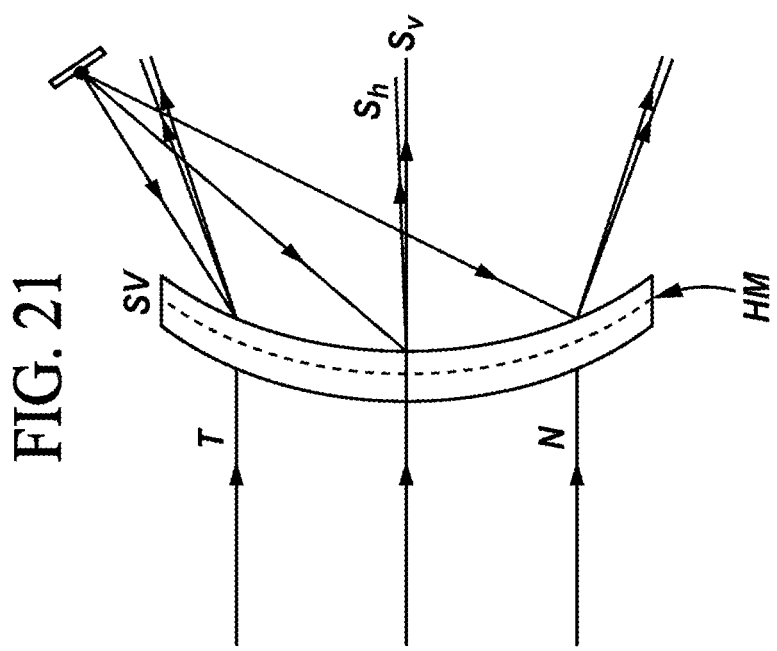

See FIG. 21. T: temporal side, N: nasal side, SV: single vision lens.

On this figure, the spherical powers $S_v$ and $S_h$ are equal on the entirety of the surface of the lens: S=−1δ.

2. Cylindrical Power

If the lens has a cylinder power, characterized by a power $C_v$ and a cylinder axis $A_v$, then the recording of the holographic mirror is such that wave front after reflection on the holographic mirror and exiting the lens (refraction), has a cylinder power $C_h$ and cylinder axis $A_h$ of values identical or close to those of the lens.

It can be considered that the difference in cylinder power between $C_v$ and $C_h$ should be equal or below 0.25 D, preferentially of ≤1δ.

Thus: $C_h \approx C_v$ and $A_v \approx A_h$,

Preferably abs($C_v - C_h$)≤0.25δ or 0.5δ or 1δ

Preferably abs ($A_v - A_h$)≤10° for cylinders ≤0.5δ abs ($A_v - A_h$)≤4° for cylinders ≥0.5δ.

3. Features of the Holographic Mirror as a Function of Lens Areas (Gaze Directions)

Figure 22:
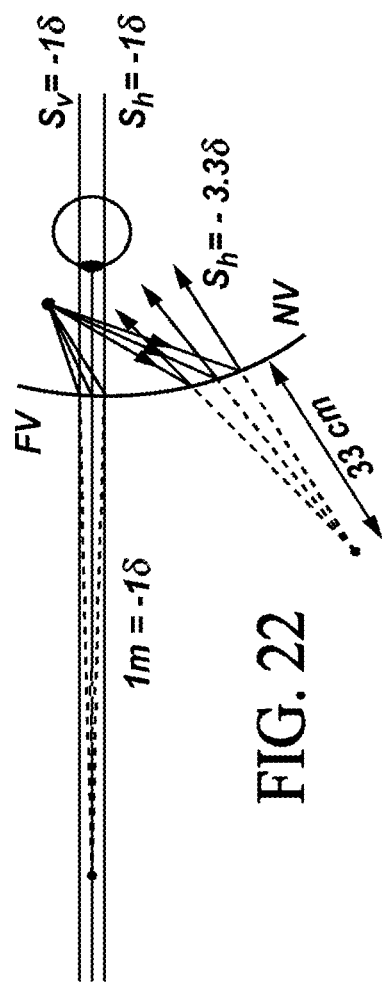
FIGS. 21-22-23 show lenses of the invention.

See FIG. 22. FV: far vision, NV near vision.

Several situations may be identified.

3A. Unifocal Lens

Preferably, the wave surface after reflection on the holographic mirror and exiting the lens (refraction) is such that it has a negative power change (negative addition) between the upper part (area) of the lens and the lower part (area) of the lens.

Indeed, the implementation of a negative addition at the lower part of the lens allows to bring the virtual image at a finite distance for visualization, and thus brings the virtual image and the real field of view into in the same vision plane (generally, the lower part of the lens is used for gaze directions towards an object located at close distance). This allows to simultaneously visualize with acuity the virtual image and the real image.

For example, the SV lens wearer observes, through the lower part of the lens, an object situated at a distance of 33 cm. Therefore accommodation is of 3.33δ. In order to see the virtual image with acuity, this image should be positioned at −33 cm, so that the wave surface reflected by the mirror has a power −3.33δ.

Thus: 0≥Addh=Sh_lower−Sh_upper

Preferably: 0≥Addh=Sh_lower−Sh_upper≥−3,5δ or −4δ

The variation in addition (Addh) may be continuous or not.

3B. Progressive Addition Lens

In this case, the lens has a progressive design, characterized by prescription values for far vision ($S_v$, $C_v$, $A_v$) in the FV area of the lens, and an addition value which is reached in the near vision area (Addv).

The recording of the holographic mirror is such that the wave surface after reflection on the holographic mirror and exiting the lens (refraction) has a power variation Addh, wherein Addh is such that ADDH this power variation is:
- its sign is opposite to that of Addv: Addh<0
- its amplitude increases as the value of addition Addv decreases: abs (Addh) varies in the opposite direction to abs (Addv),
- the power variation of the wave surface reflected by the hologram following the position of the lens power variation: the value of Addh is reached on the lens in the NV area wherein the value of Addv is also reached, and follows the same trend.

For example:
An emmetropic presbyopic wearer with a value of addition of 1.5δ has an accommodation reserve of at least 1.8δ in order to focus at a distance of 33 cm (3.3δ). Therefore the virtual image may be situated at a distance of −55 cm at the nearest, which corresponds to a power change of −1.8δ to the wave surface reflected by the holographic mirror.

An emmetropic presbyopic wearer with a value of addition of 3.5δ has no reserve of accommodation. Therefore the virtual image should be positioned at infinite distance for virtual acuity, therefore the variation in power of the wave surface reflected by the hologram is zero or close to zero.

3C. Orientation of the Wave Surface Generated by the Holographic Mirror

See FIG. 22. The image source S'1 is imaged from source S1 trough a lens L1. The holographic mirror is recorded such that the wave front does not have the same inclination.

The wave surface reflected by the mirror is essentially horizontal in the region of far vision of the lens. It has an upward inclination in the lower area of the glass, so that the light rays are directed toward the eye.

This may be reflected in the fact that the focal point of the wave surface reflected by the mirror is located in lower position with respect to the optical axis of the lens.

The invention claimed is:

1. An Ophthalmic lens supply system for providing an ophthalmic lens configured to be fitted onto a frame and worn by a wearer, said ophthalmic lens comprising a holographic mirror and said frame comprising a build-in image source configured for illuminating said holographic mirror so as to cause, upon reflection onto said holographic mirror, the visualization of a virtual image by the wearer, said ophthalmic lens being configured for correcting the wearer's virtual vision, said supply system comprising:
first processing means configured for placing an order of an ophthalmic lens, wherein said first processing means are located at a lens ordering side and comprise:
inputting means configured to input wearer prescription data;
inputting means configured to input frame data, wherein said frame data comprise at least one image source data;
second processing means configured for providing lens data based upon wearer prescription data, wherein said second processing means are located at a lens determination side and comprise outputting means configured for outputting said lens data, and
first transmission means configured for transmitting said wearer prescription data and for transmitting said frame data, from said first processing means to said second processing means;
manufacturing means configured for manufacturing an ophthalmic lens based upon lens data and frame data, wherein said manufacturing means are located at a lens manufacturing side; and
second transmission means configured for transmitting said lens data from said second processing means to said manufacturing means, wherein
said manufacturing means comprise means configured for recording the holographic mirror by performing holographic recording of a film of unrecorded holographic medium by generating interference between a reference beam and an illumination beam to provide the ophthalmic lens comprising the holographic mirror, wherein the holographic recording is performed in an optical arrangement that takes into account at least the configuration of the frame, such that the illumination beam is configured to differentially record a plurality of areas on the film of unrecorded holographic medium, and wherein
each area corresponds to equal or distinct values of distance of visualization of said displayed virtual image by the wearer, or corresponds to equal or distinct directions of visualization of said displayed virtual image by the wearer.

2. A method for providing an ophthalmic lens configured to be fitted onto a frame and worn by a wearer, wherein said ophthalmic lens comprises a holographic mirror and wherein said frame comprises a build-in image source configured for illuminating said holographic mirror to cause, upon reflection onto said holographic mirror, visualization of a virtual image by the wearer, said ophthalmic lens being configured for correcting the wearer's virtual vision, said method comprising:
providing an ophthalmic lens having a front surface and a rear surface,
wherein said ophthalmic lens comprises a film of unrecorded holographic medium; and
performing holographic recording of said holographic medium by generating interference between a reference beam and an illumination beam to provide an ophthalmic lens comprising a holographic mirror, wherein the holographic recording is performed in an optical arrangement that takes into account at least the configuration of the frame, wherein
the optical arrangement is such that:
(i) the illumination beam is configured to differentially record a plurality of areas on the film of unrecorded holographic medium, wherein each area corresponds to equal or distinct values of distance of visualization of said virtual image by the wearer, or corresponds to equal or distinct directions of visualization of said virtual image by the wearer, and
(ii) the reference beam simulates the beam of the build-in image source to be used for illuminating said holographic mirror, to cause display of the virtual image to be visualized by the wearer when wearing the frame.

3. The method according to claim 2, wherein the holographic recording further takes into account a distance of visualization of said displayed virtual image by the wearer when wearing the frame, or a direction of visualization of said displayed virtual image by the wearer when wearing the frame, or the number of areas of the holographic mirror for the visualization of said displayed virtual image by the wearer when wearing the frame.

4. The method according to claim 2, wherein the wearer is ametropic, and wherein the ophthalmic lens is configured for correcting the wearer's ametropia for natural vision and is selected from single-vision lenses, multifocal lenses such as bifocal lenses and progressive addition lenses.

5. The method according to claim 2, wherein, in the ophthalmic lens:
the unrecorded holographic medium is selected from dichromated gelatins and photopolymers, and
the film of unrecorded holographic medium is provided on the front surface of the ophthalmic lens, on the rear surface of the ophthalmic lens, or between the front surface and the rear surface of the ophthalmic lens.

6. The method according to claim 2, wherein the optical arrangement is such that:
the illumination beam is configured to define a distance of visualization of said displayed virtual image by the wearer when wearing the frame, or a direction of visualization of said displayed virtual image by the wearer when wearing the frame, or the number of areas of the holographic mirror for the visualization of said displayed virtual image by the wearer when wearing the frame.

7. The method according to claim 2, wherein the wearer is ametropic,
wherein said method is a method for providing a progressive addition lens, respectively a multifocal lens, respectively a single-vision lens, wherein
the ophthalmic lens is a progressive addition lens, respectively a multifocal lens, respectively a single-vision lens, and wherein
the holographic recording is performed so that the holographic mirror comprises at least an area for near vision and an area for far vision corresponding to distinct values of distance of visualization of displayed virtual image by the wearer.

8. The method according to claim 2, wherein the wearer is ametropic,
wherein said method is a method for providing a single-vision lens, respectively a multifocal lens, respectively a progressive addition lens, wherein the ophthalmic lens is a semi-finished lens blank, wherein
the optical arrangement includes implementation of an auxiliary single-vision lens, respectively an auxiliary multifocal lens, respectively an auxiliary progressive addition lens, whose optical power takes into account the optical power required to correct the wearer's ametropia and the optical power of the semi-finished lens blank, and wherein
the auxiliary single-vision lens, respectively the auxiliary multifocal lens, respectively the auxiliary progressive addition lens, is for spatially configuring the reference beam or the illumination beam.

9. The method according to claim 2, wherein the providing the ophthalmic lens further comprises an amplitude modulation cell selected from electrochromic cells, polarizing cells and photochromic cells, and wherein the method further comprises cutting the lens obtained from the performing holographic recording.

* * * * *